United States Patent
Sugiyama

(10) Patent No.: US 9,152,363 B2
(45) Date of Patent: Oct. 6, 2015

(54) PRINT CONTROL APPARATUS CONTROLLING DELETION OF PRINT JOB HISTORY AND JOB DATA BASED ON A SET RETENTION PERIOD

(71) Applicant: CANON KABUSHIKI KAISHA, Tokyo (JP)

(72) Inventor: Mikiko Sugiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 13/911,846

(22) Filed: Jun. 6, 2013

(65) Prior Publication Data

US 2013/0335778 A1    Dec. 19, 2013

(30) Foreign Application Priority Data

Jun. 13, 2012    (JP) .................................. 2012-133395

(51) Int. Cl.
*G06F 3/12*    (2006.01)
*G06K 15/00*    (2006.01)

(52) U.S. Cl.
CPC .............. *G06F 3/1273* (2013.01); *G06F 3/122* (2013.01); *G06F 3/1274* (2013.01); *G06F 3/1286* (2013.01)

(58) Field of Classification Search
CPC ... G06F 3/1273; G06F 3/1286; G06F 3/1274; G06F 3/122
USPC ......................................................... 358/1.16
See application file for complete search history.

(56) References Cited

U.S. PATENT DOCUMENTS

2007/0143354 A1*    6/2007    Morooka ...................... 707/200
2011/0029572 A1*    2/2011    Sato ............................. 707/802

FOREIGN PATENT DOCUMENTS

JP            11-129556            5/1999

* cited by examiner

*Primary Examiner* — Fred Guillermety
(74) *Attorney, Agent, or Firm* — Fitzpatrick, Cella, Harper & Scinto

(57) ABSTRACT

An information processing apparatus 101 processes a print job based on job data inputted from a PC 103 to a hot folder and retains print job history information and job data relating to the print job history information. The information processing apparatus 101 receives an instruction from a user and determines a dependency relation between the job history information and the job data to set a retention period of the print job history information and a retention period of the job data so that the retention period of the print job history information is over the retention period of the job data. The information processing apparatus 101 deletes the print job history information and the job data based on the set retention period of the print job history information and the retention period of the job data.

17 Claims, 17 Drawing Sheets

FIG. 6

HISTORY INFORMATION OF HOT FOLDER PRINT JOB — 601

| JOB NAME | HOT FOLDER NAME | STATE | PRINTER NAME | NUMBER | INPUT DATE | ENDING DATE | JOB NUMBER |
|---|---|---|---|---|---|---|---|
| Job15 | HF_Flexible01 | PROCESSING | iPF9100 | 1 | 12/02/2011 10:15 | 12/2/2011 10:25 | 0000001020 |
| Job14 | HF_Flexible01 | ERROR | iPF9100 | 2 | 12/02/2011 09:52 | 12/2/2011 09:55 | 0000001019 |
| Job13 | HF_Flexible02 | END | DL5000 | 1 | 12/02/2011 09:40 | 12/2/2011 09:51 | 0000001018 |
| Job12 | HF_Fixed03 | END | C7010VP | 5 | 12/02/2011 09:38 | 12/2/2011 09:45 | 0000001017 |
| Job11 | HF_Flexible03 | END | C7010VP | 10 | 12/02/2011 09:37 | 12/2/2011 09:47 | 0000001016 |

602 — 603 — 604 — 605 — 606 — 607 — 608 — 609 — 610

SET RETAINING PERIOD

FIG. 7

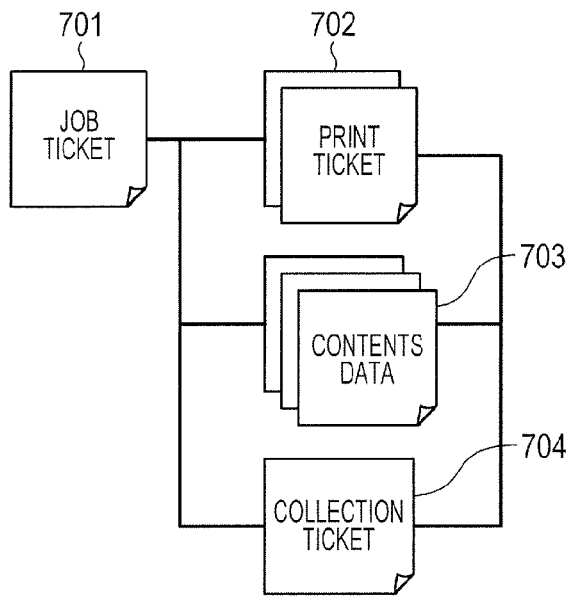

FIG. 8

| 801 | JOB NAME | NAME OF JOB FOLDER STARTING OR PRINT CONTENTS DATA |
|---|---|---|
| 802 | HOT FOLDER NAME | NAME OF HOT FOLDER |
| 803 | STATE | |
| 804 | PRINTER NAME | NAME OF PRINTER |
| 805 | NUMBER | NUMBER OF PRINTS |
| 806 | INPUT RECEPTION TIME | TIME OF TRANSFERRING FROM HOT FOLDER MONITOR TO HOT FOLDER CONTROLLER |
| 807 | PRINT END TIME | TIME OF PRINT END OR TIME OF ENDING JOB FOR PARTICULAR REASON |
| 808 | JOB NUMBER | ID IDENTIFYING JOB |
| 809 | PATH TO JOB TICKET | PATH TO JOB TICKET |
| 810 | PATH TO PRINT TICKET LIST | PATH TO PRINT TICKET LIST |
| 811 | PATH TO CONTENTS DATA | PATH TO CONTENTS DATA LIST |
| 812 | CAUSE OF ERROR | CAUSE OF ERROR AT OCCURRENCE OF PARTICULAR ERROR |
| 813 | RESULT FILE | BUS TO PRINT RESULT (DETAILED INFORMATION) FILE |

FIG. 13

SET DETAIL OF RETENTION PERIOD

SET RETENTION PERIODS OF JOB HISTORY AND JOB DATA

JOB HISTORY INFORMATION: 30 DAYS (1 TO 30) — 1301
PRINT SETTING INFORMATION: 1 DAYS (1 TO 30) — 1302
CONTENTS DATA: 1 DAYS (1 TO 30) — 1303
APPLY — 1304

| JOB NAME | HOT FOLDER NAME | STATE | PRINTER | NUMBER | START DATE/TIME | END DATE/TIME | JOB NUMBER | RETENTION PERIOD OF JOB HISTORY | RETENTION PERIOD OF PRINT SETTING INFORMATION | CONTENTS DATA (CT) NAME | RETENTION PERIOD OF CONTENTS DATA (CT) |
|---|---|---|---|---|---|---|---|---|---|---|---|
| Job15 | HF_Flexible01 | PROCESSING | iPF9100 | 1 | 12/2/2011 10:15 | 12/2/2011 10:25 | 0000001020 | 30 DAYS | 30 DAYS | a.jpg | 30 DAYS |
|  |  |  |  |  |  |  |  |  |  | b.pdf | 30 DAYS |
|  |  |  |  |  |  |  |  |  |  | c.pdf | 30 DAYS |
| Job14 | HF_Flexible01 | ERROR | iPF9100 | 2 | 12/2/2011 09:52 | 12/2/2011 09:52 | 0000001019 | 1 DAY | 30 DAYS | a.jpg | 0 DAYS |
|  |  |  |  |  |  |  |  |  |  | b.pdf | 0 DAYS |
|  |  |  |  |  |  |  |  |  |  | c.jpg | 0 DAYS |
| Job13 | HF_Flexible02 | END | DL5000 | 1 | 12/2/2011 09:40 | 12/2/2011 09:51 | 0000001018 | 20 DAYS | 20 DAYS | g.jpg | 20 DAYS |
|  |  |  |  |  |  |  |  |  |  | h.jpg | 0 DAYS |
| Job12 | HF_Fixed03 | END | C7010VP | 5 | 12/2/2011 09:38 | 12/2/2011 09:45 | 0000001017 | 15 DAYS | 5 DAYS | i.Tiff | 15 DAYS |
| Job11 | HF_Flexible03 | END | C7010VP | 10 | 12/2/2011 09:37 | 12/2/2011 09:47 | 0000001016 | 10 DAYS | 10 DAYS | i.Tiff | 20 DAYS |
|  |  |  |  |  |  |  |  |  |  | k.Tiff | 20 DAYS |
|  |  |  |  |  |  |  |  |  |  | l.Tiff | 0 DAYS |
|  |  |  |  |  |  |  |  |  |  | m.Tiff | 20 DAYS |

OK — 1310    CANCEL — 1311

FIG. 24

| 801 | JOB NAME | NAME OF STARTED JOB FOLDER OR PRINT CONTENTS DATA |
|---|---|---|
| 802 | HOT FOLDER NAME | INDIVIDUAL NAME OF HOT FOLDER |
| 803 | STATE | |
| 804 | PRINTER NAME | INDIVIDUAL NAME OF PRINTER |
| 805 | NUMBER | PRINT NUMBER |
| 806 | INPUT RECEPTION TIME | TIME OF TRANSFERRING FROM HOT FOLDER MONITORING UNIT TO HOT FOLDER CONTROL UNIT |
| 807 | PRINT END TIME | TIME OF ENDING PRINT OR OF ENDING PROCESSING JOB FOR CERTAIN REASON |
| 808 | JOB NUMBER | ID IDENTIFYING JOB |
| 2400 | RETENTION PERIOD OF JOB HISTORY | RETENTION PERIOD OF JOB HISTORY |
| 2401 | PASS TO PRINT SETTING INFORMATION | PASS TO PRINT SETTING INFORMATION |
| 812 | CAUSE OF ERROR | CAUSE OF ERROR IN CASE OF OCCURRING ANY ERROR |
| 813 | RESULT FILE | PASS TO PRINT RESULT (DETAILED INFORMATION) FILE |

PRINT CONTROL APPARATUS CONTROLLING DELETION OF PRINT JOB HISTORY AND JOB DATA BASED ON A SET RETENTION PERIOD

BACKGROUND OF THE INVENTION

1. Field of the Invention

The present invention relates to a printing technique using a hot folder for printing job data inputted to a folder.

2. Description of the Related Art

Conventionally, an example of a known system for printing an imaged photograph includes a printing system for creating a photographic print of an album by inputting and printing image data to be printed.

In the printing system, when contents data (image data or text data) to be printed is designated, the contents data and a print setting information file (a setting file describing information (print setting information) related to a setting of a printer for producing a print) are stored in a folder called a hot folder. The hot folder denotes a folder set in a high-capacity storage apparatus, such as a hard disk, and contents data to be printed is stored.

A hot folder application has a folder monitoring function, and when new image data is stored in the hot folder, the data is detected to execute print processing. The hot folder application is different from a normal printing application in that the printing function can be realized by simply inputting data to the folder without using a special API, when the application is used from another system such as a photographic processing system.

The hot folders are roughly classified into two types, a flexible type and a fixed type. The flexible type denotes a hot folder without print setting information specific to the folder, and content data and a print setting information file need to be inputted to the folder for each job. The fixed type denotes a hot folder with print setting information specific to the folder, and printing is possible just by inputting contents data.

In the flexible-type hot folder, the print setting needs to be inputted, along with the contents data, to the hot folder every time. The fixed-type hot folder is provided to reduce that load.

In a conventional technique, the hot folder is used to list a plurality of pieces of job history information (print history information for one print job) in order to check an execution result of a printed job. The list of the job history information allows checking an interruption or an error in the printing. Along with the job history information, job data (print setting information file and contents data) associated with the print job can be held to reprint the print job with an error or interruption (Japanese Patent Application Laid-Open No. H11-129556).

In a holding method of the data associated with the print job in the conventional technique, a set of all necessary data (job history information, print setting information file and contents data) is held for one print job.

When the job history information, the print setting information file and the contents data are collectively held, unnecessary print setting information file and contents data are left even if, for example, only the history of the print job needs to be checked for a purpose other than for re-printing. Therefore, the disk capacity is wastefully consumed.

When a printed job is applied to print the data by replacing only part of the contents data, the replaced print data is unnecessary, and it is only necessary to hold required contents data.

The data necessary for the print job is automatically held in the conventional technique, and the user needs to check the disk capacity to organize the disk if necessary. Therefore, the disk capacity may become full if the user does not organize the disk.

SUMMARY OF THE INVENTION

The present invention has been made to solve the problem.

An object of the present invention is to provide a mechanism for reducing consumption of storage resources by unnecessary job data, in a printing environment for producing a print based on job data inputted to a hot folder.

According to an aspect of the present invention, a print control apparatus for processing a print job based on job data inputted to a predetermined storage region comprises: a print job history storage unit configured to store print job history information for management of a history of the print job; a job data storage unit configured to store job data relating to the print job history information; a setting unit configured to set a retention period of the print job history information and a retention period of the job data, responsive to receiving an instruction from an user; and a control unit configured to control deletions of the print job history information and the job data, based on the retention period of the print job history information and the retention period of the job data set by the setting unit, wherein the setting unit determines a dependency relation between the print job history information and the job data, and, based on the determination, sets the retention period of the print job history information and the retention period of the job data.

According to the present invention, consumption of storage resources by unnecessary job data can be reduced, in a printing environment for producing a print based on job data inputted to a predetermined storage region.

Further features of the present invention will become apparent from the following description of exemplary embodiments with reference to the attached drawings.

BRIEF DESCRIPTION OF THE DRAWINGS

FIG. 6 is a diagram illustrating an example of an image of a list of job history information according to a first embodiment.

FIG. 7 is a diagram illustrating an example of job data of a hot folder according to the first embodiment.

FIG. 8 is a diagram illustrating an example of job history information corresponding to one print job according to the first embodiment.

FIG. 13 is a diagram illustrating an example of a retention period setting image according to a fourth embodiment.

FIG. 24 is a diagram illustrating an example of job history information according to the fourth embodiment.

DESCRIPTION OF THE EMBODIMENTS

Preferred embodiments of the present invention will now be described in detail in accordance with the accompanying drawings.

[First Embodiment]

Figure 1:
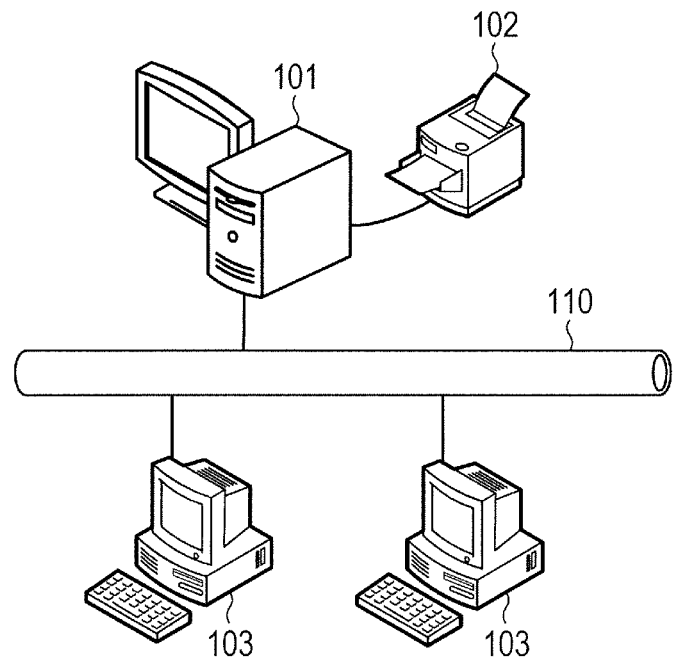
FIG. 1 is a diagram illustrating an example of a configuration of an entire image forming system indicating an embodiment of the present invention.

FIG. 1 is a diagram illustrating an example of a configuration of an entire image forming system indicating an embodiment of the present invention. In FIG. 1, an information processing apparatus 101 stores a hot folder application. Although the information processing apparatus 101 may be one of a personal computer (PC) and a dedicated terminal, the information processing apparatus 101 is a PC in the description of the present embodiment.

In the present embodiment, a hot folder is created in an external storage apparatus 304 (FIG. 3) in the information processing apparatus 101. The present invention is not limited to this, and a hot folder may be separately created in a high-capacity external storage apparatus outside of the information processing apparatus 101.

A printer (printing apparatus) 102 is connected to the information processing apparatus 101. The printer 102 may be one of a laser printer, an inkjet printer and a thermal printer, and the printer 102 is not limited by a printing method. The printer 102 prints data inputted to the hot holder.

Although one printer is connected to the information processing apparatus 101 in FIG. 1, a plurality of printers may be connected. A printer may be connected to the information processing apparatus 101 through a network 110.

A personal computer (PC) 103 is for inputting print data to the hot folder. The PC 103 can refer to the hot folder of the information processing apparatus 101 shared through the network 110, and the user can store data in the hot folder from the PC 103. This allows printing in the printer 102.

One of wired and wireless LANs (Local Area Networks) can be used to realize the network 110.

As described, the information processing apparatus 101 functions as a print control apparatus that controls a series of processes for processing a print job based on job data inputted from the PC 103 to the hot folder (predetermined storage region) to print the print job by the printer 102.

Figure 2:
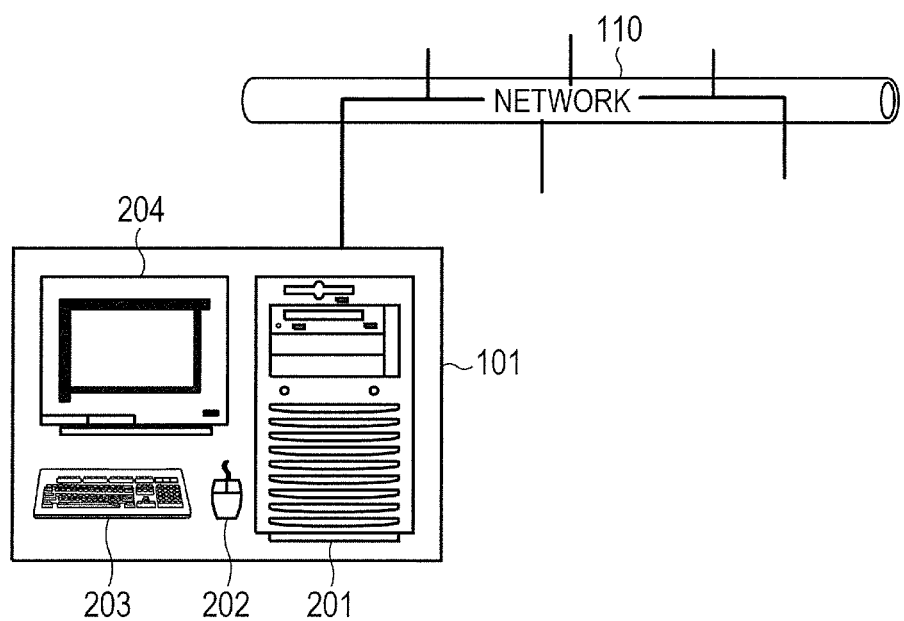
FIG. 2 is a diagram illustrating an example of a hardware configuration of an information processing apparatus 101.

FIG. 2 is a diagram illustrating an example of a hardware configuration of the information processing apparatus 101.

As illustrated in FIG. 2, a main constituent device of the information processing apparatus 101 is a personal computer 201. A mouse 202, a keyboard 203 and a display 204 are connected to input/output terminals corresponding to the devices included in the personal computer body 201. The client PC 103 also has a PC configuration similar to the information processing apparatus 101 in the description of the present embodiment.

Figure 3:
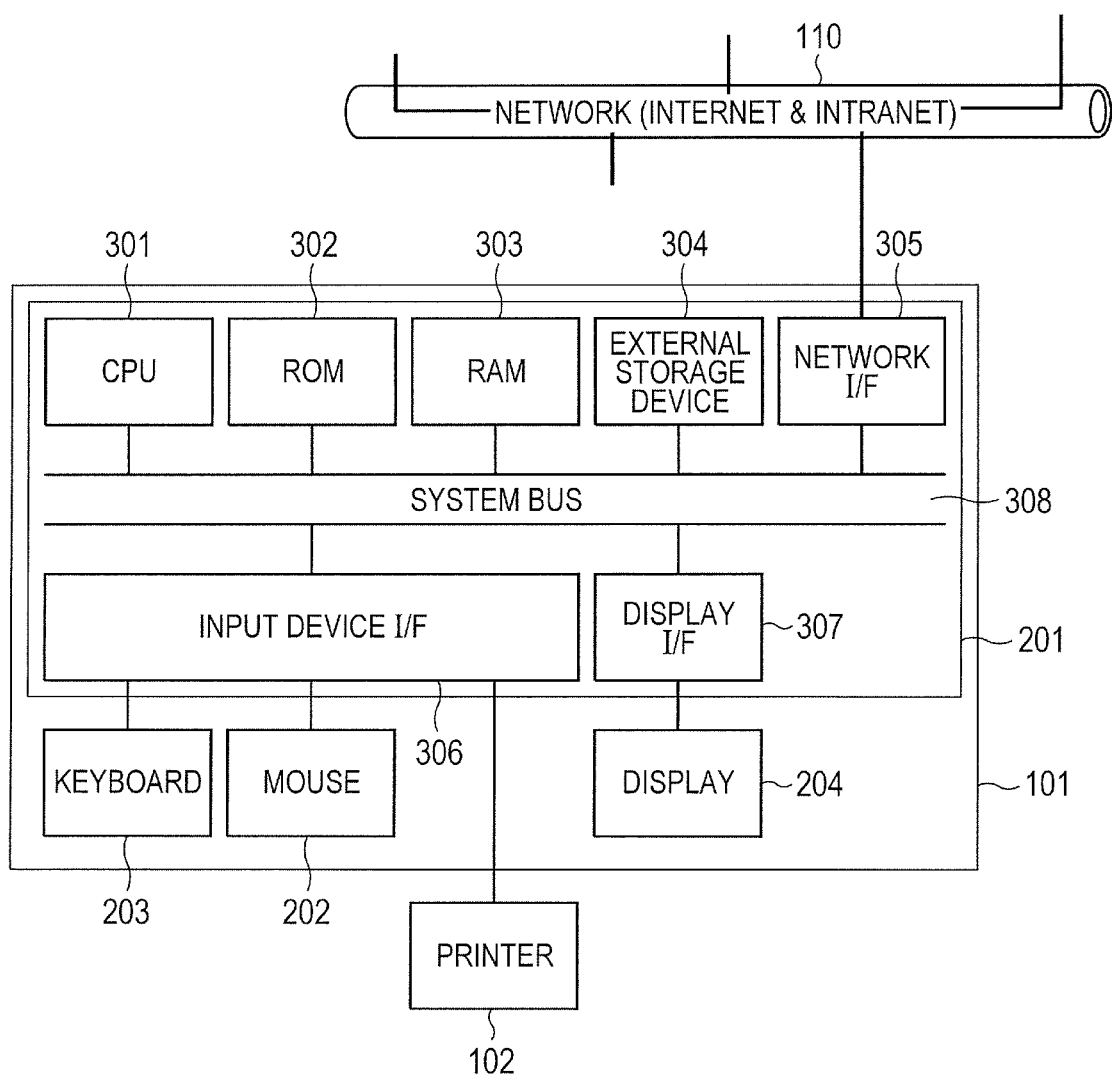
FIG. 3 is a diagram illustrating an internal configuration of the information processing apparatus 101.

FIG. 3 is a diagram illustrating an internal configuration of the information processing apparatus 101.

A printing function using a hot folder is operated by a hot folder application executed on the personal computer 201. Hereinafter, an internal configuration of the information processing apparatus 101 including the personal computer 201 will be described.

The information processing apparatus 101 includes a CPU 301, a ROM 302, a RAM 303, the external storage apparatus 304, a network I/F 305, an input/output device I/F 306, a display I/F 307, a system bus 308, the display 204, the keyboard 203 and the mouse 202.

The CPU 301 is configured to execute control processing of the entire information processing apparatus 101. The ROM (Read Only Memory) 302 is a read-only memory. Examples of the ROM 302 include a PROM (Programmable ROM) that allows the user to electrically write a program and a mask ROM in which the content is written in the manufacturing. The ROM 302 may be any one of the ROMs in the present embodiment.

The RAM (Random Access Memory) 303 is a read-write memory. The RAM 303 has a function of temporarily storing data in the execution of processing of the present embodiment.

The external storage apparatus 304 is a non-volatile storage apparatus. Examples of the external storage apparatus 304 include an HD (Hard Disk) drive, an SSD (Solid State Drive), an FD drive, an MO drive, a CD-RW drive, a DVD-RW drive and a Blu-ray drive. The external storage apparatus 304 can store hot folder program data and data necessary to operate the hot folder program data.

The network I/F 305 controls communication for connection to a network such as an intranet, and various communication interfaces are applied according to the environment of the user. The network I/F 305 is connected to a wireless LAN or an Ethernet interface.

The input/output device I/F 306 is configured to process input/output from the keyboard 203 and the mouse 202 included in the information processing apparatus 101 as well as from the printer 102. The input/output device I/F 306 is used for the operation of the information processing apparatus and for the data input/output.

The display I/F 307 and the display apparatus 204 are display units. The display apparatus 204 is realized by using one of a CRT, a liquid crystal display, a plasma display, a rear-projection TV and a front projector as well as a control circuit thereof.

The system bus 308 is configured to exchange various data between blocks in the information processing apparatus and to supply power. The system bus 308 includes address lines, data lines, control lines and power/ground lines.

In the information processing apparatus 101, the CPU 301 reads and executes a computer-readable hot folder application recorded in the external storage apparatus 304 to realize the printing function using the hot folder. Therefore, the hot folder application (FIG. 4) is operated on the personal computer 201.

Figure 4:
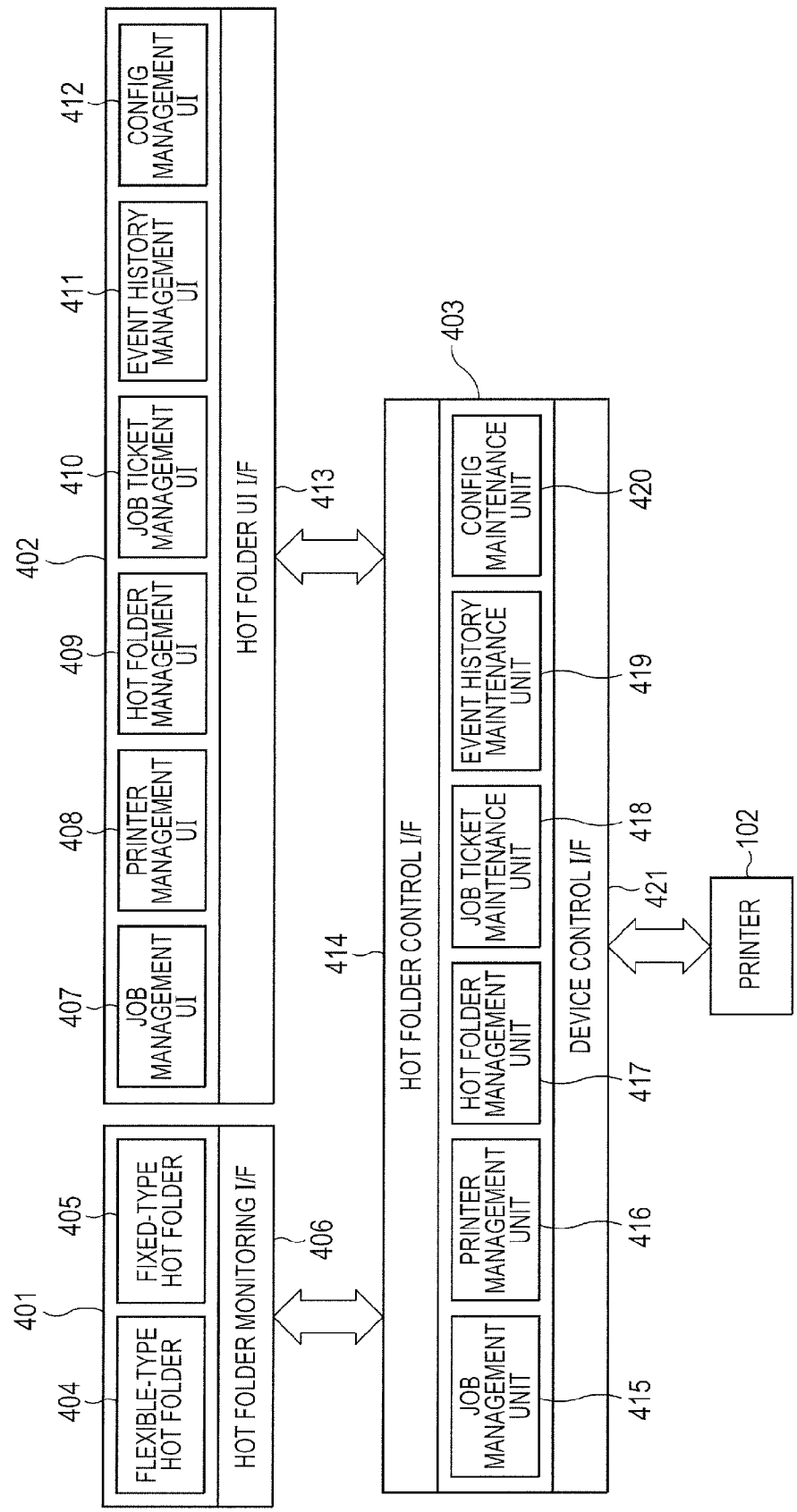
FIG. 4 is a diagram illustrating an example of a program configuration of a hot folder application of the information processing apparatus 101.

FIG. 4 is a diagram illustrating an example of a program configuration of the hot folder application of the information processing apparatus 101.

In FIG. 4, a hot folder monitor 401 is configured to monitor the hot folder and to detect print data. A hot folder UI 402 is configured to manage information to be displayed on the display in the hot folder. A hot folder controller 403 is configured to manage the control of the hot folder.

The hot folder application program includes the hot folder monitor 401, the hot folder UI 402 and the hot folder controller 403.

In the hot folder monitor 401, a flexible-type hot folder monitor 404 monitors a folder in which the setting can be changed in each printing. A fixed-type hot folder monitor 405 monitors a folder in which the setting is not changed in each printing. When a new print request is generated, the print request is transferred to the hot folder controller 403 through a hot folder monitoring I/F 406.

The hot folder monitor 401 includes the flexible-type hot folder monitor 404, the fixed-type hot folder monitor 405 and the hot folder monitoring I/F 406.

In the hot folder UI 402, a job management UI 407 is a UI display unit for print job management. A printer management UI 408 displays printer information managed by the hot folder. A hot folder management UI 409 displays managed hot folder information.

A job ticket management UI 410 displays print data and setting information called a job ticket transferred to the printer 102. An event history management UI 411 displays a history of print job information of event content (such as print end and no paper) returned from the printer 102. A config. management UI 412 is a display unit of the setting information of the hot folder application program. A hot folder UI I/F 413 is an I/F with the hot folder controller 403.

The hot folder UI 402 includes the job management UI 407, the printer management UI 408, the hot folder management UI 409, the job ticket management UI 410, the history management UI 411 of print job, the config. management UI 412 and the hot folder UI I/F 413.

In the hot folder controller 403, a hot folder control I/F 414 is connected to the hot folder monitoring I/F 406 and the hot folder UI I/F 413.

A job management unit 415 processes a print job based on job data stored in the hot folder, based on a print request from the hot folder monitor 401. The job management unit 415 also manages processed print jobs based on print job history information described later.

A printer management unit 416 manages the printer (printer 102) managed by the hot folder. A hot folder management unit 417 manages hot folder information.

A job ticket management unit 418 manages a job ticket described later. An event history management unit 419 manages an event history of print jobs, such as print end and no paper transferred from the printer 102. A config. management unit 420 manages the setting information of the hot folder program. A device control I/F 421 is an interface with the printer device (printer 102).

The hot folder controller 403 includes the hot folder control I/F 414, the job management unit 415, the printer management unit 416, the hot folder management unit 417, the job ticket management unit 418, the event history management unit 419, the config. management unit 420 and the device control I/F 421.

The components 401 to 421 are functions of the hot folder application realized by the CPU 301 reading and executing a computer-readable hot folder application recorded in the external storage apparatus 304.

Figure 5:
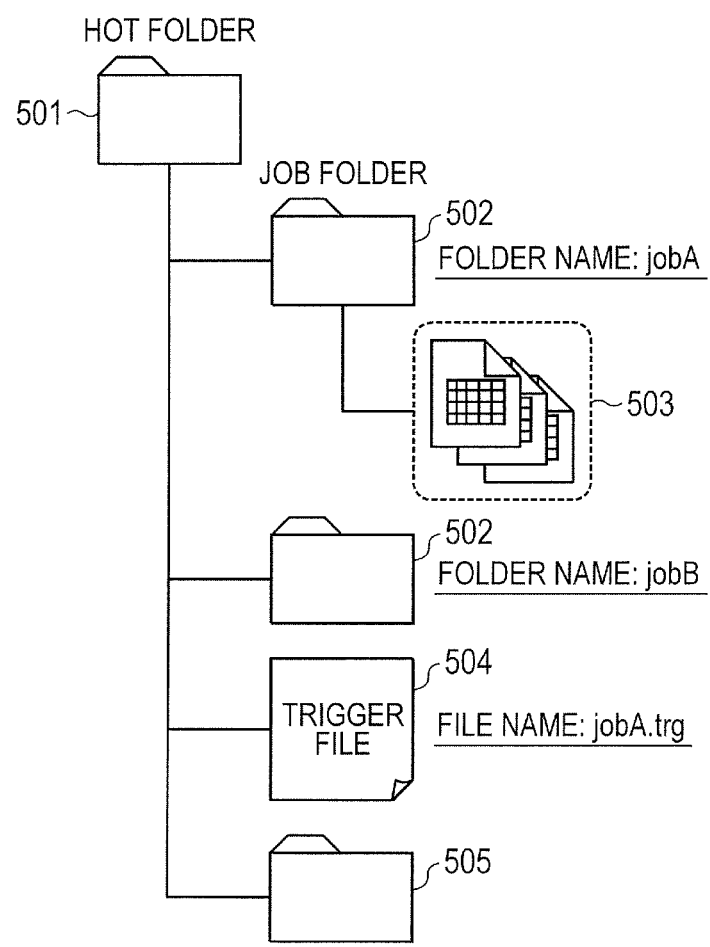
FIG. 5 is a diagram illustrating an example of a folder configuration of a hot folder created in an external storage apparatus 304 of the information processing apparatus 101.

FIG. 5 is a diagram illustrating an example of a folder configuration of a hot folder created in the external storage apparatus 304 of the information processing apparatus 101.

FIG. 5 illustrates a root folder 501 of the hot folder, job folders 502 of jobs created in the hot folder, and job data 503 stored in the job folders 502.

The job data inputted to the flexible-type hot folder includes contents data and a print setting information file. Meanwhile, the job data inputted to the fixed-type hot folder includes only contents data. The print setting information is already associated with the folder in the fixed-type hot folder, and the print setting information file does not have to be inputted.

At the timing of the placement of a trigger file 504, a process of a print job of a folder with the same name as the trigger file is started. The hot folder application arranges the trigger file 504 in the hot folder. The content of the trigger file 504 is not particularly limited as long as the file name of the trigger file 504 corresponds to the job folder for producing a print.

The user inputs contents data to the job folder at the timing of printing. The print job of the hot folder with the same name as the trigger file is started when the hot folder application places the trigger file 504 in the hot folder.

A folder 505 retains job history information, contents data and a print setting information file necessary for re-printing after the completion.

FIG. 6 is a diagram illustrating an example of an image of a list of job history information according to the first embodiment. The job management UI 407 displays the image of the list of the job history information illustrated in FIG. 6 based on the information managed by the job management unit 415.

FIG. 6 illustrates an entire list 601 of the print job history of the hot folders. The display is displayed on all or part of the display 204 of the information processing apparatus 101.

An area 602 displays names of jobs, and the names include the job folder names 502.

An area 603 displays names of hot folders, and the hot folder names are names determined at the creation of the hot folders.

An area 604 displays states of the jobs and displays the states of the jobs, such as print end, print processing and errors. An area 605 displays names of printers set to the hot folders.

An area 606 displays the numbers of prints of the jobs. An input date 607 is an area for displaying dates of the input of the print jobs to the hot folders, and particularly, dates of transferring from the hot folder monitor 401 to the hot folder controller 403.

An ending date 608 is an area for displaying dates of the end of the print jobs. A job number 609 is an area for displaying unique numbers managed in the information processing apparatus.

A button 610 is for starting a retention period setting of data relating to the jobs. Although the button is illustrated in the present invention, the setting may be started by an instruction from a menu.

In FIG. 6, the user can select an arbitrary item of the history information list.

Although not illustrated in FIG. 6, the job management UI 407 displays a processing menu not illustrated, when a right button of the mouse 202 is clicked on the image of the list of the job history information of FIG. 6. When "reprint" is instructed by the mouse 202 in the processing menu, the job management UI 407 instructs the job management unit 415 to perform re-printing based on the job history information instructed by the mouse cursor. In response to the reprint instruction, the job management unit 415 controls to execute re-processing (re-printing) of the print job based on the job history information instructed by the mouse cursor.

FIG. 7 is a diagram illustrating an example of job data of a hot holder according to the first embodiment.

The job data illustrated in FIG. 7 includes print setting information (job ticket 701 and print ticket 702), contents data 703 and a collection ticket 704. The job data corresponds to the job data 503 of FIG. 5.

The job ticket 701 corresponds to the print setting of each job and each page and holds information of a print setting that can be shared by a plurality of printers. The job ticket 701 can be applied to a case in which one job includes a plurality of print contents data (example: "cover.PDF" and "text.PDF" can be printed as one job).

The print ticket 702 includes a print setting that cannot be shared by printers. A plurality of contents data 703 can be set for the job ticket 701. The collection ticket 704 indicates image correction information when an image is corrected. The collection ticket 704 may be held in association with the contents data 703. Arbitrary numbers of the print tickets 702, the contents data 703 and the collection tickets 704 may exist for a job. For example, a print ticket for cover and a print ticket for text may exist as print tickets, and contents data for display (for example, "cover.PDF") and contents data for text (for example, "text.PDF") may exist as contents data.

FIG. 8 is a diagram illustrating an example of job history information corresponding to one print job according to the first embodiment.

In the present embodiment, although the job history information is retained in the external storage apparatus 304 as a text file described in a CSV format in the external storage apparatus 304, a database may also be used. Therefore, the configuration of the print job history storage that stores the job history information can be any configuration that allows the CPU 301 of the information processing apparatus 101 to derive the job history information. A plurality of pieces of job history information can be held, and the number of held pieces can be equal to the number of printed jobs. The job history information mainly includes information related to the print setting, information related to the contents data to be printed, and information related to the printed job and the execution. This will be specifically described below.

In FIG. 8, an item 801 indicates a job name, and one of a job folder name and a print contents data name inputted to the hot folder is stored in the present embodiment. An item 802 indicates a hot folder, and the name of the hot folder is stored.

An item 803 indicates a state, and the state of the job, such as print processing, print end (normal end) and error, is stored. An item 804 indicates a printer name, and the name of the printer that has executed the job is stored. An item 805 indicates a number, and the number of prints of the print job is stored.

An item 806 indicates an input time, and the time of transferring from the hot folder monitor 401 to the hot folder controller 403 is stored. An item 807 indicates a print end time, and the time of print end or the time of ending the process of the job for a particular reason is stored. An item 808 indicates a job number, and the job number for uniquely identifying the job is stored.

An item 809 indicates a path to the job ticket, and the path to the retention location of the job ticket file is stored. An item 810 indicates a path to the print ticket, and the path to the retention location of the print ticket file is stored. An item 811 indicates a path to the contents data, and the path to the retention location of contents data is stored. Therefore, information for identifying the job data storage that stores the job data is stored in the items 809 to 811.

An item 812 indicates a cause of error, and the cause of error at the occurrence of a particular error is stored. An item 813 indicates a result file, and the path to the print result file is stored. The path to the print result file may not be for the file, but may be a pointer for a print result information table stored on the memory.

Figure 9:
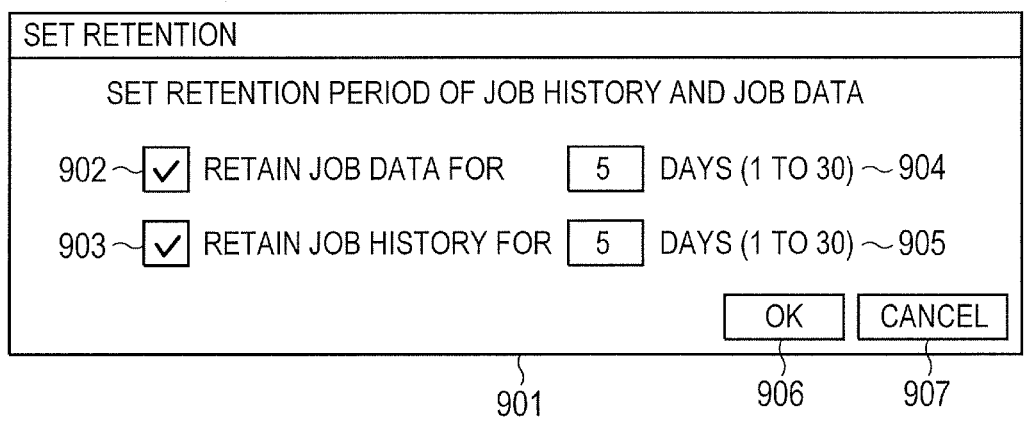
FIG. 9 is a diagram illustrating an example of a retention period setting image displayed when an instruction to set a retention period is received according to the first embodiment.

FIG. 9 is a diagram illustrating an example of a retention period setting image displayed when an instruction to set a retention period is received according to the first embodiment. The config. management UI 412 displays the retention period setting image on the display 204 of the information processing apparatus 101 when the retention period setting button 610 of FIG. 6 is instructed.

In the example of the first embodiment, the job data and the job history information are separated, and the retention periods can be set in the retention period setting image. The retention periods are uniformly applied to all print jobs. Therefore, the retention period cannot be set for each print job in the present embodiment. The retention period cannot be set for each print setting information file and contents data included in the job data. A fourth embodiment illustrates a case that allows setting the retention period one by one.

FIG. 9 illustrates an entire display 901 of the retention period setting image. An area 902 is for receiving, from the user, a designation of the retention setting state of the job data indicating whether to retain the job data (print setting information file and contents data). Hereinafter, the area 902 will be called a job data retention period setting.

An area 903 is for receiving, from the user, a designation of the retention setting state of the job history indicating whether to retain the job history information. Hereinafter, the area 903 will be called a job history retention period setting.

An area 904 is for receiving, from the user, a designation of the setting of the retention period of the job data. Hereinafter, the area 904 will be called a job data retention period. Although 1 to 30 days can be set for the job data retention period 904 in the present embodiment, the period is not limited to this.

An area 905 is for receiving, from the user, a designation of the setting of the retention period of the job history information. Hereinafter, the area 905 will be called a job history information retention period. Although 1 to 30 days can be set for the job history information retention period 905 in the present embodiment, the period is not limited to this.

An OK button 906 is for updating the retention period information (FIG. 10) based on the setting content of 902 to 905 and for ending the retention period setting image. A cancel button 907 is for ending the retention period setting image without updating the retention period information.

Figure 10:
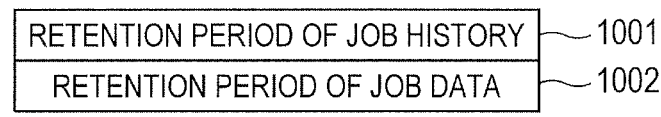
FIG. 10 is a diagram illustrating an example of retention period information according to the first embodiment.

FIG. 10 is a diagram illustrating an example of retention period information according to the first embodiment.

As illustrated in FIG. 10, the retention period information of the first embodiment includes a job history information retention period 1001 and a job data retention period 1002. The retention period information is stored in the external storage apparatus 304 of FIG. 3.

Figure 11:
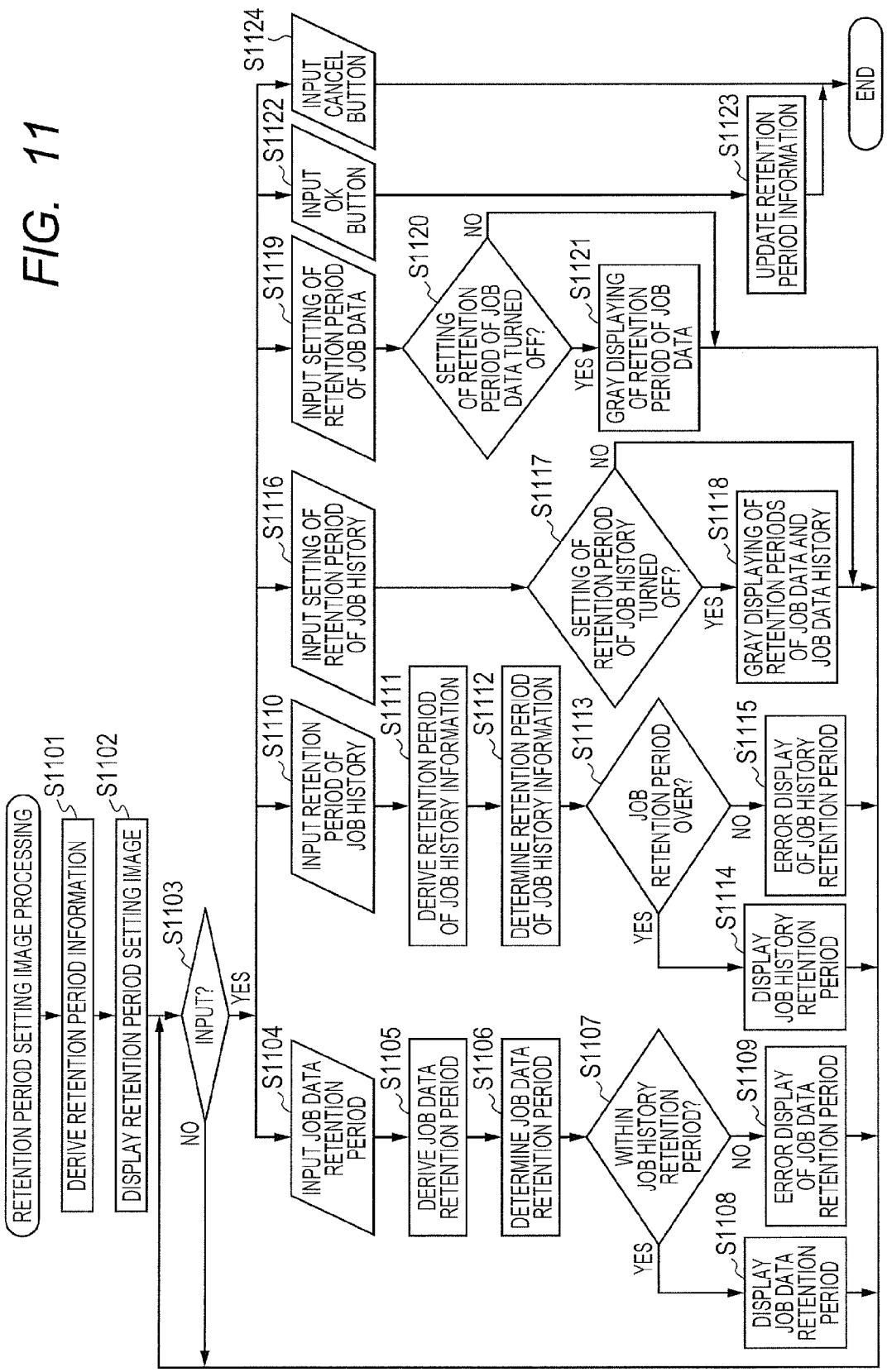
FIG. 11 is a flow chart illustrating an example of retention period setting processing according to the first embodiment.

FIG. 11 illustrates retention period setting processing in the retention period setting image 901 described above. FIG. 11 is a flow chart illustrating an example of retention period setting processing according to the first embodiment. The config. management UI 412 executes the processing of the flow chart. More specifically, the CPU 301 reads and executes a computer-readable program recorded in one of the external storage apparatus 304 and the ROM 302 to realize the processing of the flow chart. FIG. 11 illustrates steps S1101 to S1124.

In S1101, the CPU 301 derives information indicating the retention setting state of the job history information (whether to retain the information), the retention period of the job history information, the retention setting state of the job data (whether to retain the data) and the retention period of the job data, from the retention period information (FIG. 10) stored in the external storage apparatus 304. At the startup, the hot folder application may read in advance the retention period information from the external storage apparatus 304 and store the information in the RAM 303 to derive the information from the storage region. In the present embodiment, the retention setting information of the job history information (whether to retain the information) and the retention setting state of the job data (whether to retain the data) are derived from the job history information retention period 1001 and the job data retention period 1002, respectively. For example, an impossible period, such as "−1", is inputted as the job history information retention period 1001 or the job data retention period 1002 to indicate that the information or the data is not retained for the retention setting state. The method of indicating the retention setting state is not limited to this, and a flag indicating the retention setting state can be stored in the retention period information.

In S1102, the CPU 301 displays the retention period setting image based on the information derived in S1101. If the job history information retention period 1001 derived in S1101 indicates "not set", the CPU 301 turns off the job history retention period setting 903 to display the setting in gray. The CPU 301 sets a retention period to the job history information retention period 905 and displays the setting in gray. If the job data retention period 1002 derived in S1101 indicates "not set", the CPU 301 turns off the job data retention period setting 902 and displays the setting in gray. The CPU 301 sets a retention period to the job data retention period 904 and displays the setting in gray.

In S1103, the CPU 301 enters an input waiting state in the retention period setting image.

If the CPU 301 detects input to the retention period setting image (Yes in S1103), the CPU 301 moves the process according to the input.

If the CPU 301 detects a change in the input to the job data retention period 904 (S1104), the CPU 301 derives the retention period of the job data from the job data retention period 904 in S1105. It is disclosed in the above embodiment that defaults of the job history information retention period 1001 and the job data retention period 1002 are "not set". However, it would be apparent that the defaults may be set as being retained during a period, for example, of 5 days within a scope and spirit of the present invention.

In S1106, the CPU 301 determines whether the job data retention period derived in S1105 is within the job history information retention period 905.

If the job retention period is within the job history information retention period 905 in the determination result of S1106 (Yes in S1107), the CPU 301 advances the process to S1108.

In S1108, the CPU 301 displays the job data retention period derived in S1105 on the job data retention period 904 and returns the process to the input waiting state of S1103.

On the other hand, if the job data retention period is a period longer than the job history information retention period 905 in the determination result of S1106 (No in S1107), the CPU 301 advances the process to S1109.

In S1109, the CPU 301 displays an error message indicating that the inputted retention period of the job data is longer than the job history information retention period 905. The CPU 301 further puts the setting of the job data retention period 904 back to the setting of the previously set job data retention period and returns the process to the input waiting state of S1103. In this way, if the CPU 301 receives an instruction to set the retention period of the job data longer than the retention period of the job history information, the CPU 301 produces an error display to control so as not to set the retention period of the job data longer than the retention period of the job history information. Therefore, the CPU 301 controls to prohibit setting the retention period of the job data violating the dependency relation between the retention periods.

If the CPU 301 detects a change in the input to the job history information retention period 905 (S1110), the CPU 301 derives the job history information retention period from the job history information retention period 905 in S1111.

In S1112, the CPU 301 determines whether the job history information retention period derived in S1112 is over (equal to or longer than) the job data retention period 904.

If the job history information retention period is over the job data retention period 904 in the determination result of S1112 (Yes in S1113), the CPU 301 advances the process to S1114.

In S1114, the CPU 301 displays the job history information retention period derived in S1112 on the job history information retention period 905 and returns the process to the input waiting state of S1103. On the other hand, if the job history information retention period is a period shorter than the job data retention period 904 in the determination result of S1112 (No in S1113), the CPU 301 advances the process to S1115.

In S1115, the CPU 301 displays an error message indicating that the input job history information retention period is a period shorter than the job data retention period 904. The CPU 301 further puts the setting of the job history information retention period 905 back to the setting of the previously set job history information retention period and returns the process to the input waiting state of S1103. In this way, if the CPU 301 receives an instruction to set the retention period of the job data longer than the retention period of the job history information, the CPU 301 produces an error display to control so as not to set the retention period of the job data longer than the retention period of the job history information. Therefore, the CPU 301 controls to prohibit setting the retention period of the job history information violating the dependency relation between the retention periods.

If the CPU 301 detects a change in the input to the job history retention period setting 903 (S1116), the CPU 301 advances the process to S1117.

In S1117, the CPU 301 determines whether the job history retention period setting 903 is turned off.

If the CPU 301 determines that the job history retention period setting 903 is turned off (Yes in S1117), the CPU 301 advances the process to S1118.

In S1118, the CPU 301 displays the job history retention period setting 903 and the job history information retention period 905 in gray. The CPU 301 also turns off the job data retention period setting 902 and displays the job data retention period setting 902 and the job data retention period 904 in gray. The CPU 301 returns the process to the input waiting state of S1103.

On the other hand, if the CPU 301 determines that the job history retention period setting 903 is turned on (No in S1117), the CPU 301 cancels the gray displaying of the job history retention period setting 903 and the job history information retention period 905 in a step not illustrated. The CPU 301 also cancels the gray displaying of the job data retention period setting 902 and the job data retention period 904. The CPU 301 returns the process to the input waiting state of S1103.

If the CPU 301 detects a change in the input to the job data retention period setting 902 (S1119), the CPU 301 advances the process to S1120.

In S1120, the CPU 301 determines whether the job data retention period setting 902 is turned off.

If the CPU 301 determines that the job data retention period setting 902 is turned off (Yes in S1120), the CPU 301 advances the process to S1121.

In S1121, the CPU 301 displays the job data retention period setting 902 and the job data retention period 904 in gray and returns the process to the input waiting state of S1103.

On the other hand, if the CPU 301 determines that the job data retention period setting 902 is turned on (No in S1120), the CPU 301 cancels the gray displaying of the job data retention period setting 902 and the job data retention period 904 in a step not illustrated and returns the process to the input waiting state of S1103.

If the CPU 301 detects input to the OK button 906 (S1122), the CPU 301 advances the process to S1123.

In S1123, the CPU 301 derives the retention period information from the retention period setting image 901 and updates the retention period information (job history information retention period 1001 and job data retention period 1002) of FIG. 10 stored in the external storage apparatus 304. Specifically, if the job data retention period setting 902 is turned off, the CPU 301 stores a value (for example, "−1"), which indicates that the job data will not be retained, in the job data retention period 1002 (FIG. 10) in the external storage apparatus 304. On the other hand, if the job data retention period setting 902 is turned on, the CPU 301 derives the job data retention period from the job data retention period 904 and stores the derived value in the job data retention period 1002 (FIG. 10) in the external storage apparatus 304. If the job history retention period setting 903 is turned off, the CPU 301 stores a value (for example, "−1"), which indicates that the job history information will not be retained, in the job history information retention period 1001 (FIG. 10) in the external storage apparatus 304. On the other hand, if the job history retention period setting 903 is turned on, the CPU 301 derives the job history retention period from the job history information retention period 905 and stores the derived value in the job history retention period 1002 (FIG. 10) in the external storage apparatus 304.

When the process of S1123 is completed, the CPU 301 ends the retention period setting image 901 (step not illustrated) and ends the process of the flow chart.

If the CPU 301 detects input to the cancel button 907 (S1124), the CPU 301 ends the retention period setting image 901 (step not illustrated) and ends the process of the flow chart.

Hereinafter, a process (deleting processing) of changing the retention states of the job history information and the job data based on the retention periods set in FIG. 9 will be described with reference to FIG. 12.

Figure 12:
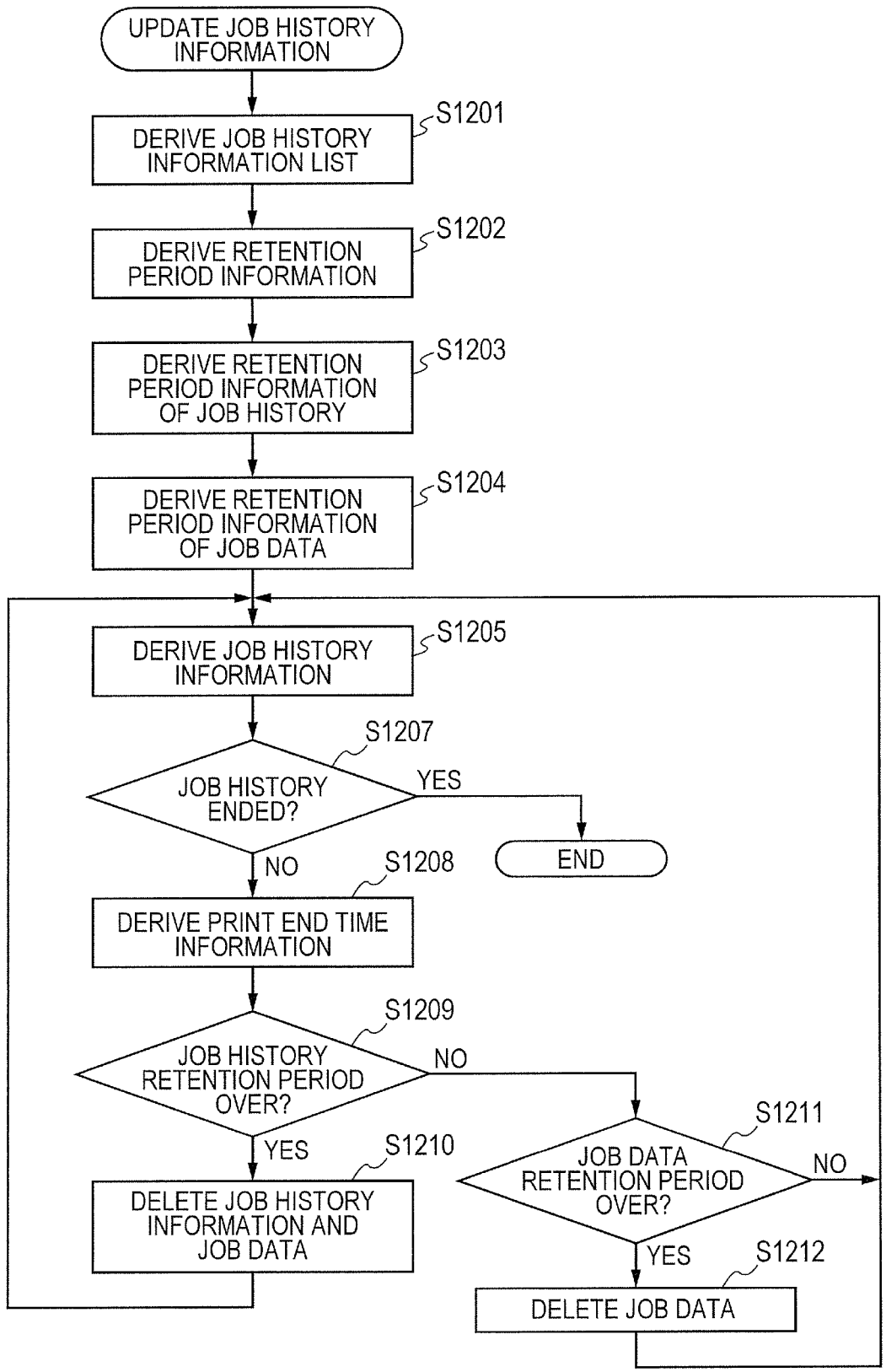
FIG. 12 is a flow chart illustrating an example of retention changing processing of job history information and job data according to the first embodiment.

FIG. 12 is a flow chart illustrating an example of retention changing processing of job history information and job data according to the first embodiment. The job management unit 415 executes the process of the flow chart. More specifically, the CPU 301 reads and executes a computer-readable program recorded in one of the external storage apparatus 304 and the ROM 302 to realize the process of the flow chart. FIG. 12 illustrates steps S1201 to S1211. The process is executed on a set date or at a set period when the list of the job history is displayed, when the date is changed, and when the retention period is changed on the retention period setting image.

In S1201, the CPU 301 derives the job history information (FIG. 8) from the external storage apparatus 304. If a plurality of pieces of job history information exists, the CPU 301 derives the entire job history information. Hereinafter, the entire job history information derived in S1201 will be collectively called a job history information list.

In S1202, the CPU 301 derives the retention period information (FIG. 10) from the external storage apparatus 304.

In S1203, the CPU 301 derives the job history information retention period 1001 from the retention period information derived in S1202.

In S1204, the CPU 301 derives the job data retention period 1002 from the retention period information derived in S1202.

The CPU 301 updates the job history information in the process of S1205 to S1212. Details will be described below.

In S1205, the CPU 301 executes a process of deriving a piece of unprocessed job history information from the job history information list derived in S1201.

In S1207, the CPU 301 determines whether update processing is finished (job history end) for the entire job history information in the job history information list.

If the CPU 301 determines that the update processing is finished (job history end) for the entire job history information in the job history information list (Yes in S1207), the CPU 301 ends the process of the flow chart.

On the other hand, if the CPU 301 determines that the job history information list still includes unprocessed job history information (not job history end) (No in S1207), the CPU 301 advances the process to S1208.

In S1208, the CPU 301 derives the print end time information 807 of the job history information (job history information to be processed) derived in S1205.

In S1209, the CPU 301 determines whether the period retaining the job history information has exceeded the job history retention period 1002 (job history retention period over) based on the job history retention period 1002 derived in S1203 and the print end time information 807 derived in S1208.

If the CPU 301 determines that the period retaining the job history information to be processed has exceeded the job history retention period 1002 (job history retention period over) (Yes in S1209), the CPU 301 advances the process to S1210.

In S1210, the CPU 301 deletes the job history information to be processed and the job data. The job data deleted in S1210 is job data (job ticket, print ticket list, contents data, and collection ticket corresponding to the contents data) referenced based on the path 809 to the job ticket of the job history information to be processed, the path 810 to the print ticket list, and the path 811 to the contents data, these paths being derived.

When the process of S1210 is completed, the CPU 301 returns the process to S1205.

On the other hand, if the CPU 301 determines that the period retaining the job history information to be processed has not yet exceeded the job history retention period 1002 in S1209 (not job history retention period over) (No in S1209), the CPU 301 advances the process to S1211.

In S1211, the CPU 301 determines whether the period retaining the job data corresponding to the job history information to be processed has exceeded (job data retention period over) the job data retention period 1002 based on the job data retention period 1002 derived in S1204 and the print end time information 807 derived in S1208.

If the CPU 301 determines that the period retaining the job data corresponding to the job history information to be processed has exceeded the job data retention period 1002 (job data retention period over) (Yes in S1211), the CPU 301 advances the process to S1212.

In S1212, the CPU 301 deletes the job data corresponding to the job history information to be processed. The job data deleted in S1212 is job data (job ticket, print ticket list, contents data, and collection ticket corresponding to the contents data) referenced based on the path 809 to the job ticket of the job history information to be processed, the path 810 to the print ticket list, and the path 811 to the contents data, these paths being derived.

When the process of S1212 is completed, the CPU 301 returns the process to S1205.

On the other hand, if the CPU 301 determines that the period retaining the job data corresponding to the job history information to be processed has not exceeded the job data retention period 1002 (not job data retention period over) in S1211 (No in S1211), the CPU 301 returns the process to S1205.

As described, according to the first embodiment, the dependency relation between the retention periods of the job history information and the job data (print setting information and contents data) can be checked and set to appropriately delete the job history data and the job data based on the retention periods to prevent unnecessary consumption of the disk capacity.

[Second Embodiment]

In the first embodiment, although the retention periods are set for the job history information and the job data as illustrated in FIG. 9, the present invention is not limited to this.

The retention periods are not set in a second embodiment, and one of "retain only job history information" and "retain job history information and job data" can be set, for example. When "retain only job history information" is set, the job data is not retained.

[Third Embodiment]

In the first embodiment, the dependency relation between the retention periods of the job history information and the job data information is the retention period of the job history information≥the retention period of the job data as illustrated in FIG. 11. If a setting that does not satisfy the relation of the retention period of the job history information≥the retention period of the job data is inputted, the setting is prohibited, and the error display is produced.

In a third embodiment, instead of producing the error display, retention periods that can be set are displayed in advance on the retention period setting image of FIG. 9, and retention periods are set from there. More specifically, only settings that satisfy the relation of the retention period of the job history information≥the retention period of the job data can be inputted.

[Fourth Embodiment]

Although the retention period of the print setting information and the retention period of the contents data are set in the first embodiment, retention periods can also be set for other targets.

In a fourth embodiment, the job data is further divided into a print setting information file and contents data, and the retention period can be further set for each print job, print setting information file, and contents data.

Hereinafter, the difference between the fourth embodiment and the first embodiment will be described.

FIG. 13 is a diagram illustrating an example of a retention period setting image according to the fourth embodiment. The same elements as in FIG. 6 are designated with the same reference numerals. The config. management UI 412 displays the retention period setting image illustrated in FIG. 13 based on the information managed by the job management unit 415 and the config. management unit 420.

Along with the list of the job history illustrated in FIG. 6, retention periods of the job history information, print setting information and contents data relating to each print job can be set in a retention period setting image 1300 illustrated in FIG. 13.

As in the job history list image 601 of FIG. 6, the job name 602 to the job number 609 are displayed on the retention period setting image 1300 of FIG. 13.

The retention period setting image 1300 further displays a retention period 1305 of job history information, a retention period 1306 of print setting information, a contents data name 1307 and a retention period 1308 of contents data of each print job.

Figure 15:
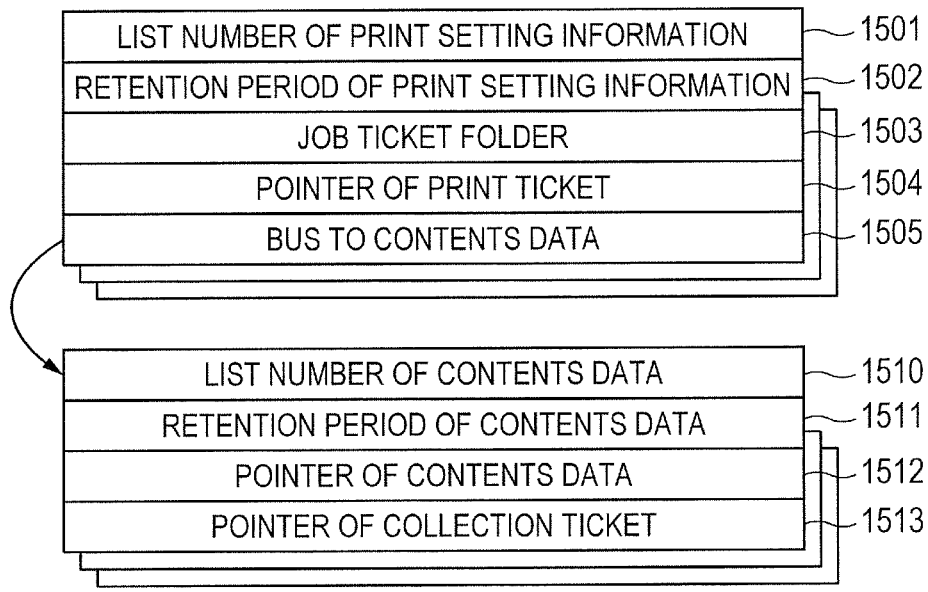
FIG. 15 is a diagram illustrating an example of print setting information according to the fourth embodiment.

The config. management UI 412 refers to print setting information illustrated in FIG. 15 based on a job history retention period 2400 and a path 2401 to print setting information of job history information illustrated in FIG. 24 to display the data 1305 to 1308.

A retention period list 1309 displays from the job name 602 to the job number 609 and from the job history information retention period 1305 to the contents data retention period 1308.

FIG. 24 is a diagram illustrating an example of job history information according to the fourth embodiment, and the same elements as in FIG. 8 are designated with the same reference numerals. The job history information is stored in the external storage apparatus 304.

In FIG. 24, the job history information of the fourth embodiment includes the job history retention period 2400 and the path 2401 to the print setting information.

A retention period of the job history information corresponding to the job history information is stored in the job history retention period 2400. A path to the retention location on the external storage apparatus 304 that retains the print setting information (FIG. 15) corresponding to the job history information is stored in the path 2401 to the print setting information.

FIG. 15 is a diagram illustrating an example of print setting information according to the fourth embodiment. The print setting information is stored in the external storage apparatus 304.

As illustrated in FIG. 15, the data of the print setting information of the fourth embodiment includes a list number 1501 of print setting information and print setting information (a retention period 1502 of print setting information, a pointer 1503 to job ticket, a pointer 1504 to print ticket and a path 1505 to contents data information) equivalent to the number indicated by the list number 1501 of print setting information.

The data of the contents data information includes a list number 1510 of contents data and contents data information (a retention period 1511 of contents data, a pointer 1512 to contents data and a pointer 1513 to collection ticket) equivalent to the number indicated by the list number 1510 of contents data.

In the fourth embodiment, collective setting of the retention period of the job history information, collecting setting of the retention period of the print setting information, and collective setting of the retention period of the contents data are possible for all print jobs from the retention period setting image 1300.

The retention period setting image 1300 (FIG. 13) will be described again.

The collecting setting is possible for a retention period 1301 of job history information, a retention period 1302 of print setting information and a retention period 1303 of contents data.

The days changed in the retention period 1301 of job history information, the retention period 1302 of print setting information and the retention period 1303 of contents data are reflected on the job history information retention period 1305, the print setting information retention period 1306 and the contents data retention period 1308 of the retention period list 1309, respectively, by pressing an application button 1304.

Figure 14:
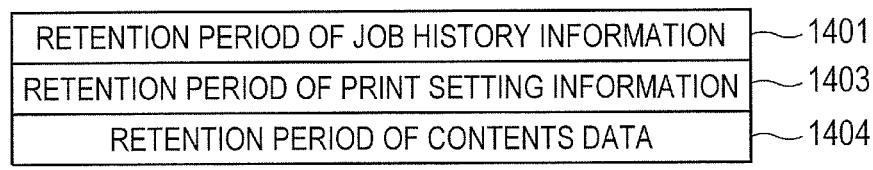
FIG. 14 is a diagram illustrating an example of retention period information according to the fourth embodiment.

The collective setting in the retention period 1301 of job history information, the retention period 1302 of print setting information and the retention period 1303 of contents data is managed as retention period information illustrated in FIG. 14 and stored in the external storage apparatus 304. The config. management UI 412 derives the retention period information illustrated in FIG. 14 at the display of the retention period setting image 1300.

FIG. 14 is a diagram illustrating an example of retention period information according to the fourth embodiment.

As illustrated in FIG. 14, the retention period information according to the fourth embodiment includes a retention period 1401 of job history information, a retention period 1403 of print setting information and a retention period 1404 of contents data. The retention period information of FIG. 14 is stored in the external storage apparatus 304 of FIG. 3, and the CPU 301 derives the retention period information from the storage region.

The retention period 1301 of collective job history information, the retention period 1302 of collective print setting information and the retention period 1303 of collective contents data changed on the retention period setting image 1300 of FIG. 13 are retained as the retention period information of FIG. 14 in the external storage apparatus 304 by pressing an OK button 1310.

The retention period 1305 of job history information, the retention period 1306 of print setting information and the retention period 1308 of contents data of each job changed on the retention period setting image 1300 are retained as the print setting information and the contents data information of FIG. 15 in the external storage apparatus 304 by pressing the OK button 1310.

Figure 22:
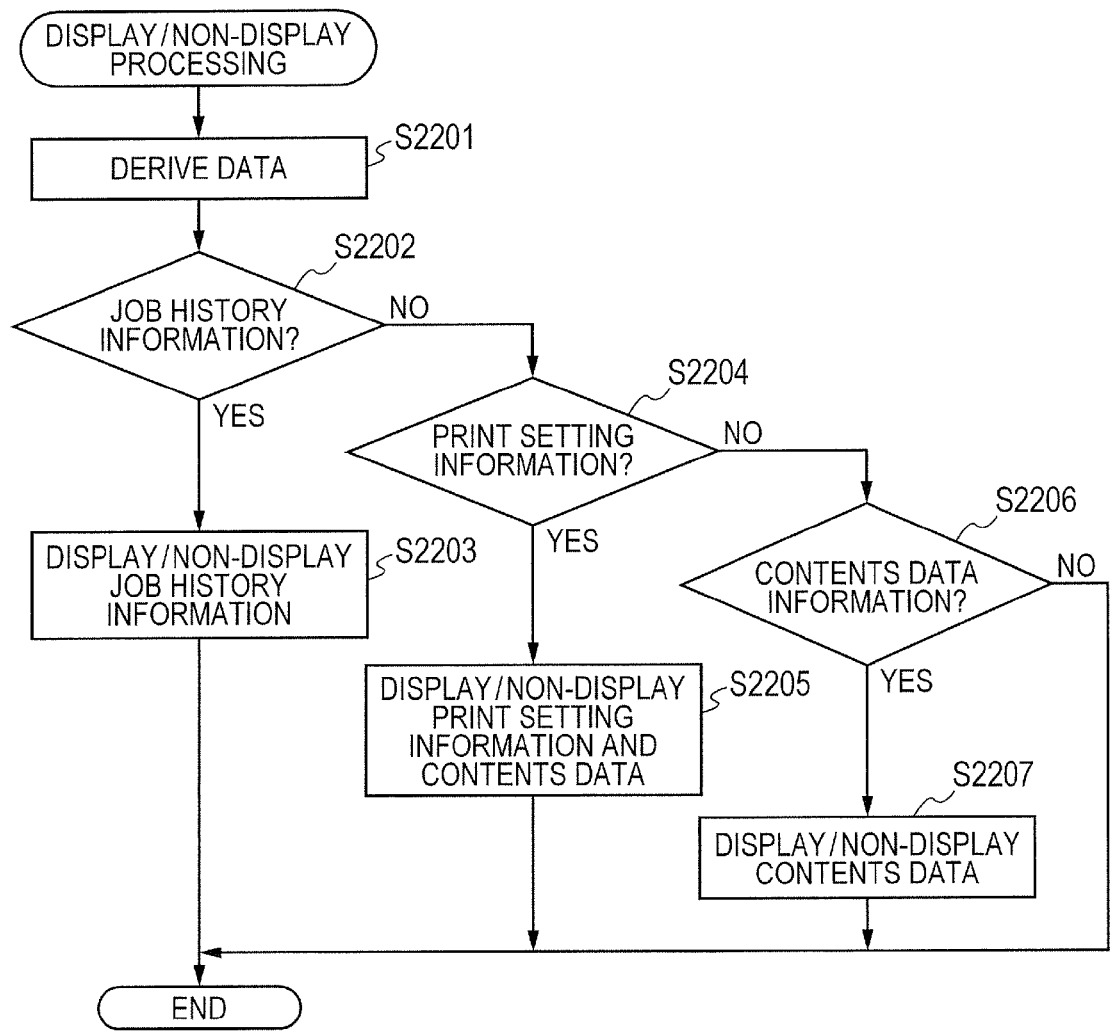
FIG. 22 is a flow chart illustrating an example of data display/non-display processing indicated in S1614 of FIG. 16.
Figure 23:
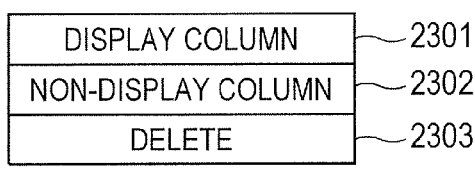
FIG. 23 is a diagram illustrating an example of a processing menu of a retention period setting image 1300 according to the fourth embodiment.

When the right button of the mouse 202 is clicked on the retention period list 1309 of the retention period setting image 1300, the config. management UI 412 displays a processing menu as illustrated in FIG. 23. When display column 2301, non-display column 2302 or delete 2303 is instructed by the mouse 202 in the processing menu (FIG. 23), the config. management UI 412 executes data display/non-display processing (S1614 of FIG. 16). The data display/non-display processing (S1614 of FIG. 16) will be described in detail later in FIG. 22.

FIG. 23 is a diagram illustrating an example of the processing menu of the retention period setting image 1300 according to the fourth embodiment.

Processing in the retention period setting image 1300 as illustrated above will be described with reference to flow charts of FIGS. 16 to 22.

Figure 16:
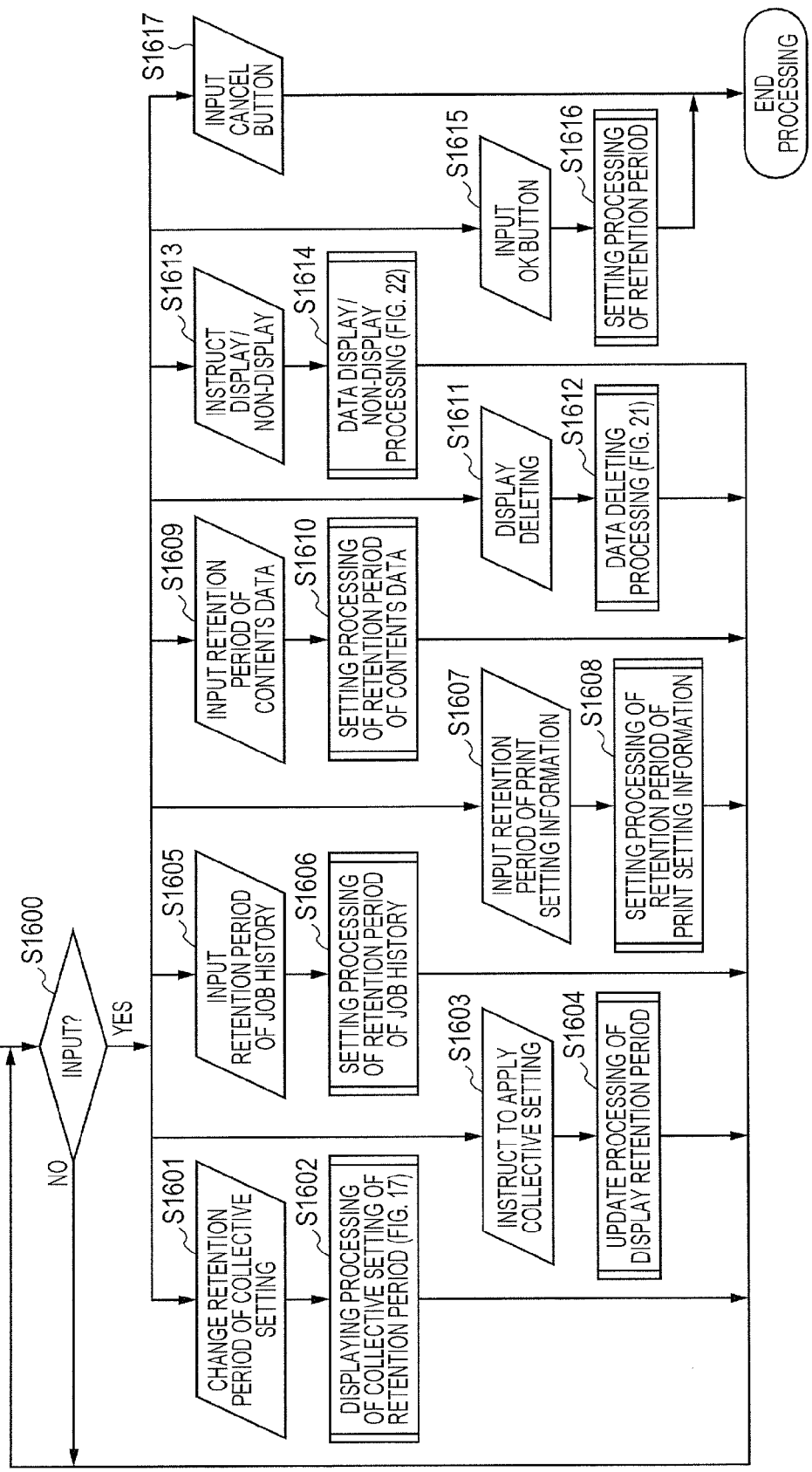
FIG. 16 is a flow chart illustrating an example of retention period setting processing according to the fourth embodiment.

FIG. 16 is a flow chart illustrating an example of retention period setting processing according to the fourth embodiment. FIG. 16 illustrates steps S1601 to S1617.

The config. management UI 412 executes the processing of the flow charts illustrated in FIGS. 16 to 22. More specifically, the CPU 301 reads and executes a computer-readable program recorded in one of the external storage apparatus 304 and the ROM 302 to realize the processing of the flow charts illustrated in FIGS. 16 to 22.

In S1600, the CPU 301 derives the retention period information of FIG. 14, the information retained in the print setting information and the contents data information of FIG. 15, and the job history information of FIG. 24. The CPU 301 displays the retention period setting image 1300 based on the derived information and enters an input waiting state in the retention period setting image 1300.

If the CPU 301 detects input to the retention period setting image (Yes in S1600), the CPU 301 moves the process according to the input.

If the CPU 301 detects a change in the input to the retention period of collective setting (the retention period 1301 of collective job history information, the retention period 1302 of collective print setting information, and the retention period 1303 of collective contents data) (S1601), the CPU 301 executes displaying processing of collective setting of retention period in S1602 (S1602). The displaying processing of collective setting of retention period of S1602 will be described in detail later in FIG. 17.

When the displaying processing of collective setting of retention period of S1602 is completed, the CPU 301 returns the process to the input waiting state of S1600.

If the CPU 301 detects input for instructing application of collective setting (press of the application button 1304) (S1603), the CPU 301 executes update processing of retention period collective setting display in S1604. In the update processing of retention period collective setting display of S1604, the retention periods are derived from the retention periods of collective setting (1301, 1302 and 1303) of the job history list image of FIG. 13, and the derived retention periods are applied to the retention periods of the retention period list 1309. Therefore, as in the update processing of job history information illustrated in FIG. 12 of the present invention, the CPU 301 executes loop processing of each piece of job history information to update the information of the retention periods.

When the update processing of retention period display of S1604 is completed, the CPU 301 returns the process to the input waiting state of S1600.

If the CPU 301 detects a change in the input to the job history information retention period 1305 (S1605), the CPU 301 executes job history retention period setting processing (S1606). The job history retention period setting processing of S1606 will be described in detail later in FIG. 18.

When the job history retention period setting processing of S1606 is completed, the CPU 301 returns the process to the input waiting state of S1600.

If the CPU 301 detects a change in the input to the retention period 1306 of the print setting information (S1607), the CPU 301 executes retention period setting processing of the print setting information (S1608). The retention period setting processing of the print setting information of S1608 will be described in detail later in FIG. 19.

When the retention period setting processing of the print setting information of S1608 is completed, the CPU 301 returns the process to the input waiting state of S1600.

If the CPU 301 detects a change in the input to the retention period 1308 of the contents data (S1609), the CPU 301 executes retention period setting processing of the contents data (S1610). The retention period setting processing of the contents data of S1610 will be described in detail later in FIG. 20.

When the retention period setting processing of the contents data of S1610 is completed, the CPU 301 returns the process to the input waiting state of S1600.

If the CPU 301 detects input of a deletion instruction (designation of the delete 2303 of data after displaying an image as illustrated in FIG. 23 by right-click of the mouse 202 on the retention period setting image 1300) (S1611), the CPU 301 executes data deleting processing (S1612). The data deleting processing of S1612 will be described in detail later in FIG. 21.

When the data deleting processing of S1612 is completed, the CPU 301 returns the process to the input waiting state of S1600.

If the CPU 301 detects input of an instruction for display or non-display of data (designation of one of the display column 2301 and the non-display column 2302 after displaying an image as illustrated in FIG. 23 by right-click of the mouse 202 on the retention period setting image 1300) (S1613), the CPU 301 executes data display/non-display processing (S1614). The data display/non-display processing of S1614 will be described in detail later in FIG. 22.

When the data display/non-display processing of S1614 is completed, the CPU 301 returns the process to the input waiting state of S1600.

If the CPU 301 detects input to the OK button 1310 (S1616), the CPU 301 executes retention period setting processing (S1616). In the retention period setting processing of S1616, the retention periods of the job history information, the print setting information and the contents data are stored in the retention period setting information, as in S1122 of FIG. 11.

When the retention period setting processing of S1616 is completed, the CPU 301 ends the retention period setting image 1300 (step not illustrated) and ends the processing of the flow chart.

If the CPU 301 detects input to the cancel button 1311 (S1617), the CPU 301 ends the retention period setting image 1300 (step not illustrated) and ends the processing of the flow chart.

Details of the processes illustrated in S1602, S1606, S1608, S1610, S1612 and S1614 of FIG. 16 will be described with reference to FIGS. 17 to 22.

Figure 17:
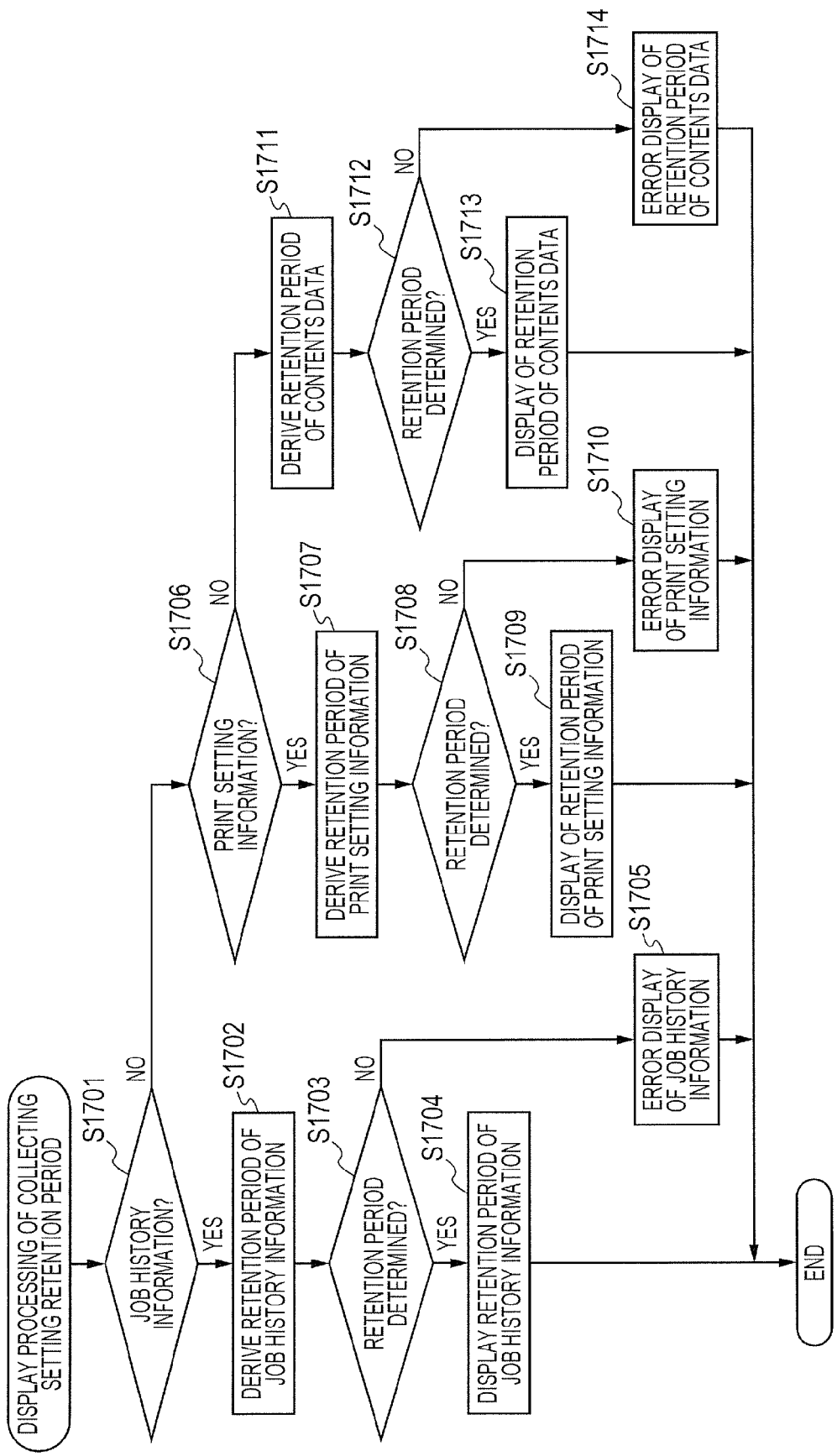
FIG. 17 is a flow chart illustrating an example of displaying processing of collective setting of retention period indicated in S1602 of FIG. 16.

FIG. 17 is a flow chart illustrating an example of the displaying processing of collective setting of retention period indicated in S1602 of FIG. 16. FIG. 17 illustrates steps S1701 to S1714.

In S1701, the CPU 301 determines whether the setting of the retention period 1301 of the collective job history information is changed.

If the CPU 301 determines that the setting of the retention period 1302 of the collective print setting information is changed (Yes in S1701), the CPU 301 advances the process to S1702.

In S1702, the CPU 301 derives the changed (inputted) value of the retention period 1301 of the collective job history information and advances the process to S1703.

In S1703, the CPU 301 executes determination processing of the value of the retention period of the collective job history information derived in S1702. In the determination processing, the CPU 301 determines whether the value of the retention period of the collective job history information is over (equal to or longer than) the value of the retention period 1302 of the collective print setting information and over the value of the retention period 1303 of the collective contents data. Therefore, the CPU 301 determines whether the retention period of the collective job history information the retention period 1302 of the collective print setting information and the retention period of the collective job history information the retention period 1303 of the collective contents data.

If the CPU 301 determines that the value of the retention period of the collective job history information is over the value of the retention period 1302 of the collective print setting information and over the value of the retention period 1303 of the collective contents data, the CPU 301 determines Yes in S1703 and advances the process to S1704.

In S1704, the CPU 301 changes the display of the retention period 1301 of the collective job history information to the value of the retention period of the collective job history information derived in S1702 and returns the process to the flow chart of FIG. 16.

On the other hand, if the CPU 301 determines that the value of the retention period of the collective job history information is smaller than the value of the retention period 1302 of the collective print setting information or smaller than the value of the retention period 1303 of the collective contents data, the CPU 301 determines No in S1703 and advances the process to S1705.

In S1705, the CPU 301 produces an error display of the retention period setting of the collective job history information on the display 204 of the information processing apparatus 101. In the error display, the CPU 301 displays an error message indicating that an error has occurred because the inputted value of the retention period of the collective job history information is smaller than the value of the retention period 1302 of the collective print setting information and smaller than the value of the retention period 1303 of the collective contents data. The CPU 301 returns the process to the flow chart of FIG. 16. In this case, the CPU 301 controls to put the value of the retention period 1301 of the collective job history information back to the value before the change. In this way, the CPU 301 produces the error display if the CPU 301 receives an instruction to set one of the retention period of the print setting information and the retention period of the contents data longer than the retention period of the job history information. The CPU 301 controls so as not to set one of the retention period of the print setting information and the retention period of the contents data longer than the retention period of the job history information. Therefore, the CPU 301 controls to prohibit setting the retention period of the job history information violating the dependency relation between the retention periods.

In S1701, if the CPU 301 determines that the setting of the retention period 1301 of the collective job history information is not changed (No in S1701), the CPU 301 advances the process to S1706.

In S1706, the CPU 301 determines whether the setting of the retention period 1302 of the collective print setting information is changed.

If the CPU 301 determines that the setting of the retention period 1302 of the collective print setting information is changed (Yes in S1706), the CPU 301 advances the process to S1707.

In S1707, the CPU 301 derives the changed value of the retention period 1302 of the collective print setting information and advances the process to S1708.

In S1708, the CPU 301 determines the value of the retention period of the collective print setting information derived in S1708. In the determination, the CPU 301 determines whether the value of the retention period of the collective print setting information is within the value of the retention period 1301 of the collective job history information and over the value of the retention period 1303 of the collective contents data. Therefore, the CPU 301 determines whether the retention period of the collective print setting information the retention period 1301 of the collective job history information and the retention period of the collective print setting information the retention period 1303 of the collective contents data.

If the CPU 301 determines that the value of the retention period of the collective print setting information is within the value of the retention period 1301 of the collective job history information and over the value of the retention period 1303 of the collective contents data, the CPU 301 determines Yes in S1708 and advances the process to S1709.

In S1709, the CPU 301 changes the display of the retention period 1302 of the collective print setting information to the value of the retention period of the collective print setting information derived in S1707 and returns the process to the flow chart of FIG. 16.

On the other hand, if the CPU 301 determines that the value of the retention period of the collective print setting information is longer than the value of the retention period 1301 of the collective job history information or shorter than the value of the retention period 1303 of the collective contents data, the CPU 301 determines No in S1708 and advances the process to S1710.

In S1710, the CPU 301 produces an error display of the retention period setting of the collective print setting information on the display 204 of the information processing apparatus 101. In the error display, the CPU 301 displays an error message indicating that an error has occurred because the inputted value of the retention period of the collective print setting information is longer than the value of the retention period 1301 of the collective job history information or shorter than the value of the retention period 1303 of the collective contents data. The CPU 301 returns the process to the flow chart of FIG. 16. In this case, the CPU 301 controls to put the value of the retention period 1302 of the collective print setting information back to the value before the change. In this way, if the CPU 301 receives an instruction to set the retention period of the job history information shorter than the retention period of the print setting information or to set the retention period of the contents data longer than the retention period of the print setting information, the CPU 301 produces an error display to control so as not to set the retention period of the job history information shorter than the retention period of the print setting information or not to set the retention period of the contents data longer than the retention period of the print setting information. Therefore, the CPU 301 controls to prohibit setting the retention period of the print setting information violating the dependency relation between the retention periods.

In S1706, if the CPU 301 determines that the setting of the retention period 1302 of the collective print setting information is not changed (No in S1706), the CPU 301 determines that the setting of the retention period 1303 of the collective contents data is changed and advances the process to S1711.

In S1711, the CPU 301 derives the changed value of the retention period 1303 of the collective contents data and advances the process to S1712.

In S1712, the CPU 301 executes determination processing of the value of the retention period of the collective contents data derived in S1711. In the determination processing, the CPU 301 determines whether the value of the retention period of the collective contents data is within (equal to or shorter than) the value of the retention period 1301 of the collective job history information and within the value of the retention period 1302 of the collective print setting information. Therefore, the CPU 301 determines whether the retention period of the collective contents data the retention period 1301 of the collective job history information and the retention period of the collective contents data the retention period 1302 of the collective print setting information.

If the CPU 301 determines that the value of the retention period of the collective contents data is within the value of the retention period 1301 of the collective job history information and within the value of the retention period 1302 of the collective print setting information, the CPU 301 determines Yes in S1712 and advances the process to S1713.

In S1713, the CPU 301 changes the display of the retention period 1303 of the collective contents data to the value of the retention period of the collective contents data derived in S1711 and returns the process to the flow chart of FIG. 16.

On the other hand, if the CPU 301 determines that the value of the retention period of the collective contents data is longer than the value of the retention period 1301 of the collective job history information or longer than the value of the retention period 1302 of the collective print setting information, the CPU 301 determines No in S1712 and advances the process to S1714.

In S1714, the CPU 301 produces an error display of the retention period setting of the collective contents data on the display 204 of the information processing apparatus 101. In the error display, the CPU 301 displays an error message indicating that an error has occurred because the inputted value of the retention period of the collective contents data is longer than the value of the retention period 1301 of the collective job history information or longer than the value of the retention period 1302 of the collective print setting information. The CPU 301 returns the process to the flow chart of FIG. 16. In this case, the CPU 301 controls to put the value of the retention period 1303 of the collective contents data back to the value before the change. In this way, if the CPU 301 receives an instruction to set the retention period of the job history information shorter than the retention period of the contents data or to set the retention period of the print setting information shorter than the retention period of the contents data, the CPU 301 produces an error display to control so as not to set the retention period of the job history information shorter than the retention period of the contents data or not to set the retention period of the print setting information shorter than the retention period of the contents data. Therefore, the CPU 301 controls to prohibit setting the retention period of the contents data violating the dependency relation between the retention periods.

Hereinafter, the retention period setting processing of the job history illustrated in S1606 of FIG. 16 will be described with reference to FIG. 18.

Figure 18:
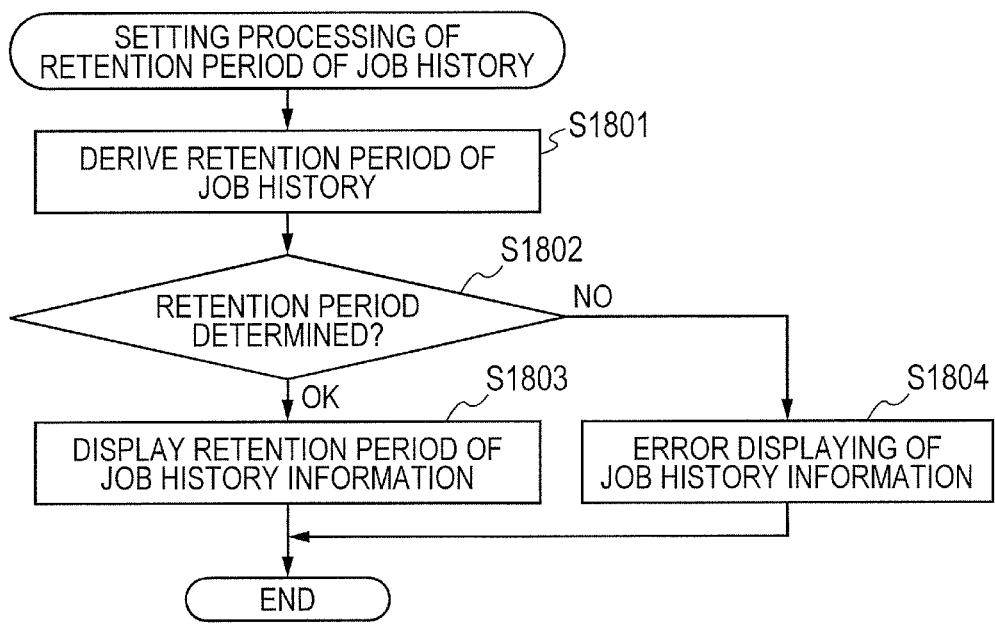
FIG. 18 is a flow chart illustrating an example of retention period setting processing of job history indicated in S1606 of FIG. 16.

FIG. 18 is a flow chart illustrating an example of the retention period setting processing of the job history illustrated in S1606 of FIG. 16. FIG. 18 illustrates steps S1801 to S1804.

In S1801, the CPU 301 derives the changed value of the retention period 1301 of the collective job history information and executes processing of S1802 to S1804. The processing of S1802 to S1804 is the same as the processing of S1703 to S1705 of FIG. 17, and the description will not be repeated.

Hereinafter, the retention period setting processing of the print setting information illustrated in S1608 of FIG. 16 will be described with reference to FIG. 19.

Figure 19:
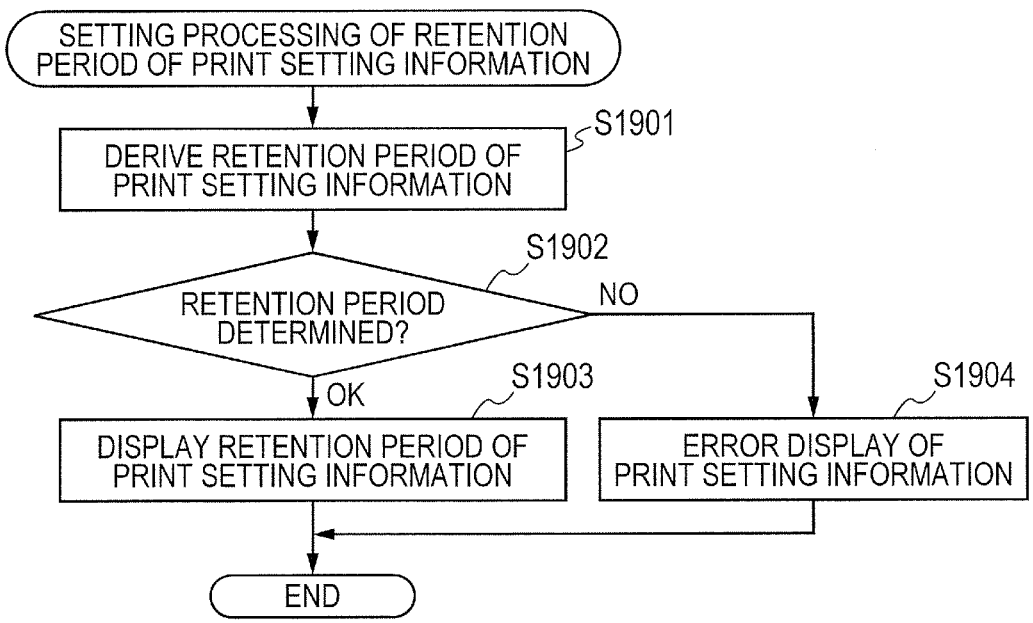
FIG. 19 is a flow chart illustrating an example of retention period setting processing of print setting information indicated in S1608 of FIG. 16.

FIG. 19 is a flow chart illustrating an example of the retention period setting processing of the print setting information illustrated in S1608 of FIG. 16. FIG. 19 illustrates steps S1901 to S1904.

In S1901, the CPU 301 derives the changed value of the retention period 1302 of the collective print setting information and executes processing of S1902 to S1904. The processing of S1902 to S1904 is the same as the processing of S1708 to S1710 of FIG. 17, and the description will not be repeated.

Hereinafter, the retention period setting processing of the contents data illustrated in S1610 of FIG. 16 will be described with reference to FIG. 20.

Figure 20:
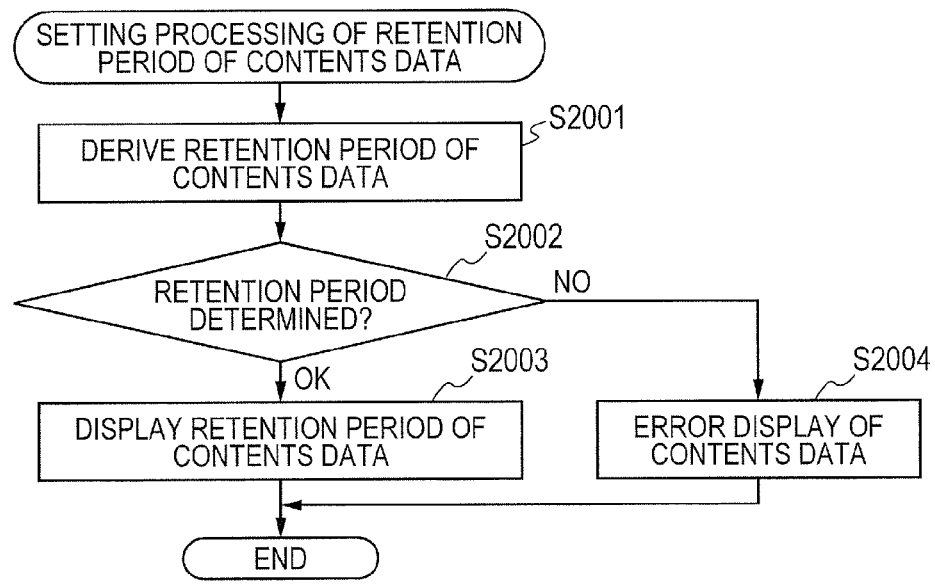
FIG. 20 is a flow chart illustrating an example of retention period setting processing of contents data indicated in S1610 of FIG. 16.

FIG. 20 is a flow chart illustrating an example of the retention period setting processing of the contents data illustrated in S1610 of FIG. 16. FIG. 20 illustrates steps S2001 to S2004.

In S2001, the CPU 301 derives the changed value of the retention period 1303 of the collective contents data and executes processing of S2002 to S2004. The processing of S2002 to S2004 is the same as the processing of S1712 to S1714 of FIG. 17, and the description will not be repeated.

As described, the CPU 301 controls to set the retention periods so as to satisfy the following dependency relation between the retention periods: "retention period of job history information≥retention period of print setting information≥retention period of collective contents data".

Hereinafter, the data deleting processing illustrated in S1612 of FIG. 16 will be described with reference to FIG. 21.

Figure 21:
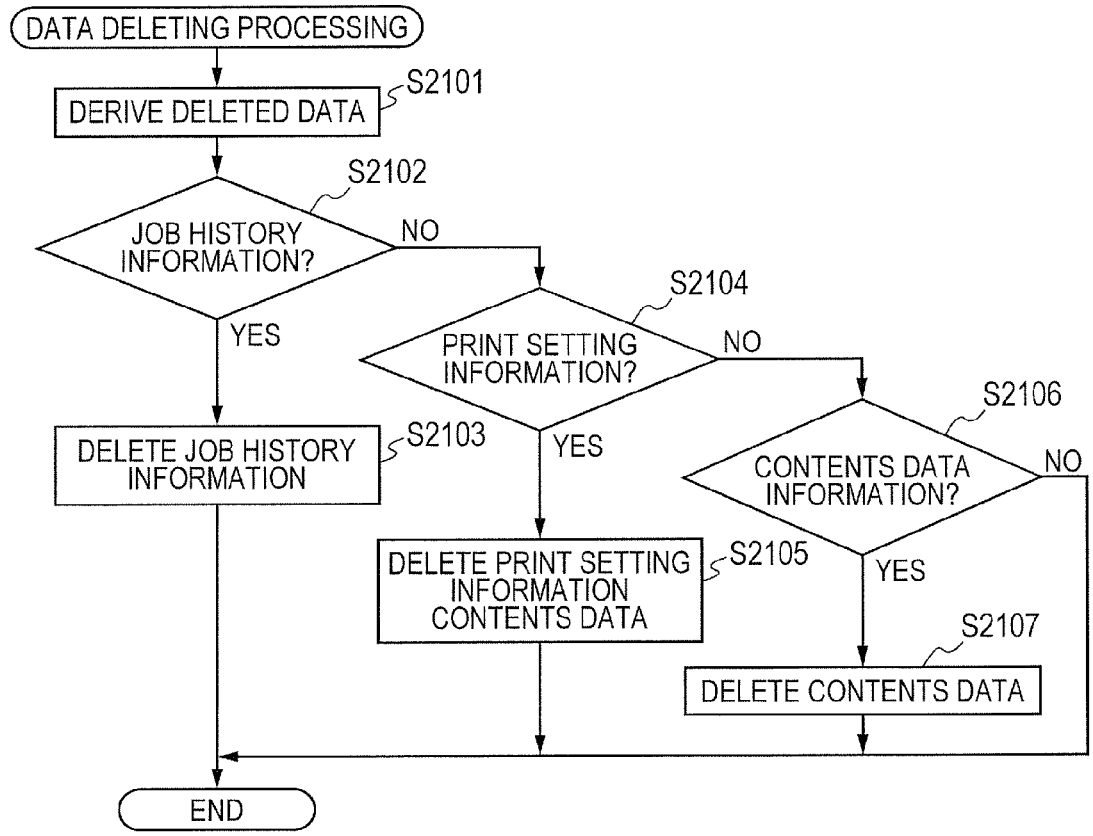
FIG. 21 is a flow chart illustrating an example of data deleting processing indicated in S1612 of FIG. 16.

FIG. 21 is a flow chart illustrating an example of the data deleting processing illustrated in S1612 of FIG. 16. FIG. 21 illustrates steps S2101 to S2107.

In S2101, the CPU 301 derives the data for which the deletion is instructed. The data indicated by the mouse cursor at the deletion instruction by right-click of the mouse is derived to derive the data for which the deletion is instructed.

In S2102, the CPU 301 determines whether the data derived in S2101 is the job history information.

If the CPU 301 determines that the data derived in S2101 is the job history information (Yes in S2102), the CPU 301 advances the process to S2103.

In S2103, the CPU 301 deletes the job history information. In the process, the CPU 301 also controls to delete the relating print setting information and contents data. In the process, the CPU 301 also controls to update the relating print setting information table and contents data information table.

When the process of S2103 is completed, the CPU 301 returns the process to the flow chart of FIG. 16.

If the CPU 301 determines that the data derived in S2101 is not the job history information in S2102 (No in S2102), the CPU 301 advances the process to S2104.

In S2104, the CPU 301 determines whether the data derived in S2101 is the print setting information.

If the CPU 301 determines that the data derived in S2101 is the print setting information (Yes in S2104), the CPU 301 advances the process to S2105.

In S2105, the CPU 301 deletes the print setting information. In the process, the CPU 301 controls to delete the relating contents data and to update the print setting information table and the contents data information table.

When the process of S2105 is completed, the CPU 301 returns the process to the flow chart of FIG. 16.

If the CPU 301 determines that the data derived in S2101 is not the print setting information in S2104 (No in S2104), the CPU 301 advances the process to S2106.

In S2106, the CPU 301 determines whether the data derived in S2101 is the contents data information.

If the CPU 301 determines that the data derived in S2101 is the contents data information (Yes in S2106), the CPU 301 advances the process to S2107.

In S2107, the CPU 301 deletes the contents data information. In the process, the CPU 301 also controls to update the relating job history information table, print setting information table and contents data information table.

When the process of S2107 is completed, the CPU 301 returns the process to the flow chart of FIG. 16.

If the CPU 301 determines that the data derived in S2101 is not the contents data information in S2106 (No in S2106), the CPU 301 returns the process to the flow chart of FIG. 16 without change.

Hereinafter, the data display/non-display processing illustrated in S1614 of FIG. 16 will be described with reference to FIG. 22.

FIG. 22 is a flow chart illustrating an example of the data display/non-display processing illustrated in S1614 of FIG. 16. FIG. 22 illustrates steps S2201 to S2207.

In S2201, the CPU 301 derives a data item for which the display or non-display of column data is instructed. The instructed data item can be derived by determining which area of item in the retention period setting image 1300 is indicated by the mouse cursor at the instruction of the display or non-display of column by right-click of the mouse.

In S2202, the CPU 301 determines whether the data item derived in S2202 is the retention period setting area 1305 of the job history.

If the CPU 301 determines that the data item derived in S2201 is the retention period setting area 1305 of the job history (Yes in S2202), the CPU 301 advances the process to S2203.

In S2203, the CPU 301 controls to display (when the display column 2301 is instructed) or non-display (when the non-display column 2302 is instructed) the column of the retention period setting area 1305 of the job history and returns the process to the flow chart of FIG. 16.

If the CPU 301 determines that the data item derived in S2201 is not the retention period setting area 1305 of the job history in S2202 (No in S2202), the CPU 301 advances the process to S2204.

In S2204, the CPU 301 determines whether the data item derived in S2201 is the retention period setting area 1306 of the print setting information.

If the CPU 301 determines that the data item derived in S2201 is the retention period setting area 1306 of the print setting information (Yes in S2204), the CPU 301 advances the process to S2205.

In S2205, the CPU 301 controls to display (when the display column 2301 is instructed) or non-display (when the non-display column 2302 is instructed) the column of the retention period setting area 1306 of the print setting information and returns the process to the flow chart of FIG. 16.

If the CPU 301 determines that the data item derived in S2201 is not the retention period setting area 1306 of the print setting information in S2204 (No in S2204), the CPU 301 advances the process to S2206.

In S2206, the CPU 301 determines whether the data item derived in S2201 is one of the contents data name area 1307 and the retention period setting area 1308 of the contents data.

If the CPU 301 determines that the data item derived in S2201 is one of the contents data name area 1307 and the retention period setting area 1308 of the contents data (Yes in S2206), the CPU 301 advances the process to S2207.

In S2207, the CPU 301 controls to display (when the display column 2301 is instructed) or non-display (when the non-display column 2302 is instructed) the columns of the contents data name area 1307 and the retention period setting area 1308 of the contents data and returns the process to the flow chart of FIG. 16.

If the CPU 301 determines that the data item derived in S2201 is not one of the contents data name area 1307 and the retention period setting area 1308 of the contents data in S2206 (No in S2206), the CPU 301 returns the process to the flow chart of FIG. 16 without change.

As described, the job data is divided into the print setting information and the contents data, and the retention period can be set for each piece of the print setting information and the contents data in the fourth embodiment.

In this way, the retention period can be set for each piece of the job history information, the print setting information files and the contents data, and the data is deleted based on the retention periods. This management can prevent unnecessary consumption of the disk capacity by the job data.

The dependency relation between the held data can be checked to prevent leaving only unnecessary contents data that cannot be reprinted.

Only necessary contents data can be left and printed when part of a plurality of contents data associated with the print setting information is replaced and printed.

Printing by applying only necessary contents data is possible, and only part of the contents data is replaced. Therefore, the amount of uploaded contents data is reduced, and quick printing is possible.

As described, the present invention has an advantageous effect that the consumption of storage resources by unnecessary job data can be reduced, in a printing environment for producing a print based on job data inputted to a predetermined storage region (hot folder).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-133395, filed Jun. 13, 2012, which is hereby incorporated by reference herein in its entirety.

What is claimed is:

1. A print control apparatus, comprising:
  a print job history storage unit configured to store print job history for checking an execution result of a print job;
  a job data storage unit configured to store job data relating to the print job history;
  a setting unit configured to set respectively (1) a condition as to whether the print job history is to be retained or not, (2) a retention period of the print job history if the print job history is to be retained, (3) a condition as to whether the job data is to be retained or not, and (4) a retention period of the job data if the job data is to be retained; and
  a control unit configured to control deletion of the print job history based on the retention period of the print job history if the setting unit sets the print job history to be retained, and to control deletion of the job data based on the retention period of the job data if the setting unit sets the job data to be retained,
  wherein the setting unit sets such that the retention period of the print job history is longer than or equal to the retention period of the job data, and
  wherein, if the setting unit sets the print job history not to be retained, the setting unit sets the job data not to be retained.

2. The print control apparatus according to claim 1, wherein, if the setting unit receives an instruction to set the retention period of the job data longer than the retention period of the print job history, an error display is produced, to control so as not to set the retention period of the job data longer than the retention period of the print job history.

3. The print control apparatus according to claim 1, wherein
  the job data includes a print setting and contents data to be printed,
  the setting unit is capable of setting a retention period of the print setting and a retention period of the contents data, determines a dependency relation between the print setting and the contents data, and, based on the determination, sets the retention period of the print setting and the retention period of the contents data, and
  the control unit deletes the print job history, the print setting and the contents data, based on the retention period of the print job history, the retention period of the print setting and the retention period of the contents data.

4. The print control apparatus according to claim 3, wherein, if the setting unit sets the retention period of the contents data longer than the retention period of the print setting, an error display is produced, to control so as not to set the retention period of the contents data longer than the retention period of the print setting.

5. The print control apparatus according to claim 1, wherein the setting unit is capable of setting, per each of print jobs, the retention period of the print job history and the retention period of the job data.

6. The print control apparatus according to claim 1, wherein the setting unit is capable of setting, per each print job, the retention period of the print job history, and is capable of setting, per each job data, the retention period of the job data.

7. The print control apparatus according to claim 3, wherein the setting unit is capable of setting, per each print job, and per each print setting, the retention period of the print job history, and is capable of setting, per each contents data, the retention period of the contents data.

8. The print control apparatus according to claim 1, further comprising a re-printing unit configured to re-process a print job based on job data relating to the print job history, in response to a reprint instruction of a print job corresponding to the print job history stored in the print job history storage unit.

9. A controlling method of a print control apparatus comprising a print job history storage unit configured to store print job history for checking an execution result of a print job and a job data storage unit configured to store job data relating to the print job history, wherein the method comprises:

setting, by a setting unit, respectively (1) a condition as to whether the print job history is to be retained or not, (2) a retention period of the print job history if the print job history is to be retained, (3) a condition as to whether the job data is to be retained or not, and (4) a retention period of the job data if the job data is to be retained; and controlling, by a control unit, deletion of the print job history based on the retention period of the print job history if the setting step sets the print job history to be retained, and deletion of the job data based on the retention period of the job data if the setting step sets the job data to be retained, wherein the setting step sets such that the retention period of the print job history is longer than or equal to the retention period of the job data, and wherein, if the setting step sets the print job history not to be retained, the setting step sets the job data not to be retained.

10. A non-transitory computer-readable storage medium on which is stored computer-executable code of a program that, if executed by a processor, causes a computer to perform the controlling method according to claim 9.

11. The controlling method according to claim 9, wherein, if, in the setting step, the retention period of the job data is set longer than the retention period of the print job history, an error display is produced, to control so as not to set the retention period of the job data longer than the retention period of the print job history.

12. The controlling method according to claim 9, wherein the job data includes a print setting and contents data to be printed, in the setting step, it is capable to set a retention period of the print setting and a retention period of the contents data, a dependency relation is determined between the print setting and the contents data, and, based on the determination, the retention period of the print setting and the retention period of the contents data are set, and the control unit deletes the print job history, the print setting and the contents data, based on the retention period of the print job history, the retention period of the print setting and the retention period of the contents data.

13. The controlling method according to claim 12, if, when, in the setting step, the retention period of the contents data is set to be longer than the retention period of the print setting, an error display is produced, to control so as not to set the retention period of the contents data longer than the retention period of the print setting.

14. The controlling method according to claim 9, wherein, in the setting step, it is capable to set, per each of print jobs, the retention period of the print job history and the retention period of the job data.

15. The controlling method according to claim 9, wherein, in the setting step, it is capable to set, per each print job, the retention period of the print job history, and it is capable to set, per each job data, the retention period of the job data.

16. The controlling method according to claim 9, wherein, in the setting step, it is capable to set, per each print job, and per each print setting, the retention period of the print job history, and it is capable to set, per each contents data, the retention period of the contents data.

17. The controlling method according to claim 9, further comprising a re-printing step of re-processing a print job based on job data relating to the print job history, in response to a reprint instruction of a print job corresponding to the print job history stored in the print job history storage unit.

* * * * *